United States Patent
Wang et al.

(10) Patent No.: US 12,196,924 B2
(45) Date of Patent: Jan. 14, 2025

(54) OPTICAL SYSTEM, IMAGE CAPTURING MODULE, AND ELECTRONIC DEVICE

(71) Applicants: OFILM GROUP CO., LTD., Shenzhen (CN); JIANGXI JINGCHAO OPTICAL CO., LTD., Nanchang (CN)

(72) Inventors: Nini Wang, Nanchang (CN); Binbin Liu, Nanchang (CN); Ming Li, Nanchang (CN); Hairong Zou, Nanchang (CN)

(73) Assignees: OFILM GROUP CO., LTD., Shenzhen (CN); JIANGXI JINGCHAO OPTICAL CO., LTD., Nanchang (CN)

(*) Notice: Subject to any disclaimer, the term of this patent is extended or adjusted under 35 U.S.C. 154(b) by 461 days.

(21) Appl. No.: 17/612,556

(22) PCT Filed: Jul. 23, 2020

(86) PCT No.: PCT/CN2020/103797
§ 371 (c)(1),
(2) Date: Nov. 18, 2021

(87) PCT Pub. No.: WO2022/016451
PCT Pub. Date: Jan. 27, 2022

(65) Prior Publication Data
US 2022/0308317 A1    Sep. 29, 2022

(51) Int. Cl.
*G02B 13/00* (2006.01)
*G02B 5/20* (2006.01)
*G02B 9/64* (2006.01)

(52) U.S. Cl.
CPC ......... *G02B 13/0045* (2013.01); *G02B 5/208* (2013.01); *G02B 9/64* (2013.01)

(58) Field of Classification Search
CPC ....... G02B 13/0045; G02B 5/208; G02B 9/64
See application file for complete search history.

(56) References Cited

U.S. PATENT DOCUMENTS

| 4,981,344 A | 1/1991 | Ueda |
| 6,414,800 B1 | 7/2002 | Hamano |

(Continued)

FOREIGN PATENT DOCUMENTS

| CN | 1206842 A | 2/1999 |
| CN | 1297164 A | 5/2001 |

(Continued)

OTHER PUBLICATIONS

International Search Report dated on Jan. 15, 2020 on International Patent Application PCT/CN2019/110525, filed Jan. 3, 2020, in the name of Jiangxi Jingchao Optical Co. Ltd.

(Continued)

*Primary Examiner* — Sharrief I Broome
*Assistant Examiner* — K Muhammad
(74) *Attorney, Agent, or Firm* — Franklin & Associates International Inc; Matthew F. Lambrinos

(57) ABSTRACT

An optical system includes: a stop; a first lens having a positive refractive power, an object side surface being convex at a paraxial area; a second lens; a third lens; a fourth lens; a fifth lens; a sixth lens having a positive refractive power, an image side surface being convex at a paraxial area; a seventh lens; and an eighth lens, an image side surface being concave a paraxial area. The optical system satisfies the condition: (MIN6*MAX8/MAX6*MIN8)≤2. MIN6 is a minimum thickness of the sixth lens in a direction of an optical axis, MAX6 is a maximum thickness of the sixth lens in the direction of the optical axis, MIN8 is a minimum thickness of the eighth lens in the direction of the optical axis, and MAX8 is a maximum thickness of the eighth lens in the direction of the optical axis.

20 Claims, 10 Drawing Sheets

(56) References Cited

U.S. PATENT DOCUMENTS

| | | | |
|---|---|---|---|
| 6,985,309 B2 | 1/2006 | Shinohara | |
| 9,057,868 B1 | 6/2015 | Chung et al. | |
| 2004/0218285 A1 | 11/2004 | Amanai | |
| 2004/0264003 A1 | 12/2004 | Noda | |
| 2005/0046970 A1 | 3/2005 | Amanai | |
| 2008/0106801 A1 | 5/2008 | Kang et al. | |
| 2010/0254029 A1 | 10/2010 | Shinohara | |
| 2012/0075718 A1 | 3/2012 | Seo | |
| 2014/0063620 A1 | 3/2014 | Jung et al. | |
| 2015/0138425 A1 | 5/2015 | Kim | |
| 2016/0124192 A1 | 5/2016 | Koreeda | |
| 2016/0161709 A1 | 6/2016 | Hsueh et al. | |
| 2017/0307858 A1 | 10/2017 | Chen | |
| 2018/0113282 A1 | 4/2018 | Tsai | |
| 2019/0121098 A1* | 4/2019 | Zhou | G02B 13/0045 |
| 2020/0073092 A1 | 3/2020 | Chen | |
| 2020/0174227 A1* | 6/2020 | Nitta | G02B 9/64 |

FOREIGN PATENT DOCUMENTS

| | | |
|---|---|---|
| CN | 101093274 A | 12/2007 |
| CN | 101983348 A | 3/2011 |
| CN | 102132189 A | 7/2011 |
| CN | 102419470 A | 4/2012 |
| CN | 102466864 A | 5/2012 |
| CN | 202522758 U | 11/2012 |
| CN | 102914851 A | 2/2013 |
| CN | 102985865 A | 3/2013 |
| CN | 102998774 A | 3/2013 |
| CN | 103676088 A | 3/2014 |
| CN | 103852858 A | 6/2014 |
| CN | 103969804 A | 8/2014 |
| CN | 104570277 A | 4/2015 |
| CN | 104570295 A | 4/2015 |
| CN | 104914558 A | 9/2015 |
| CN | 104932086 A | 9/2015 |
| CN | 204631345 U | 9/2015 |
| CN | 105259636 A | 1/2016 |
| CN | 105372793 A | 3/2016 |
| CN | 105607232 A | 5/2016 |
| CN | 105607233 A | 5/2016 |
| CN | 205210492 U | 5/2016 |
| CN | 205210493 U | 5/2016 |
| CN | 105988185 A | 10/2016 |
| CN | 105988186 A | 10/2016 |
| CN | 106033141 A | 10/2016 |
| CN | 106154496 A | 11/2016 |
| CN | 106338815 A | 1/2017 |
| CN | 106526796 A | 3/2017 |
| CN | 206074890 U | 4/2017 |
| CN | 106610518 A | 5/2017 |
| CN | 106646825 A | 5/2017 |
| CN | 106772931 A | 5/2017 |
| CN | 106773008 A | 5/2017 |
| CN | 106802469 A | 6/2017 |
| CN | 106842512 A | 6/2017 |
| CN | 106842514 A | 6/2017 |
| CN | 106896474 A | 6/2017 |
| CN | 106959500 A | 7/2017 |
| CN | 106970464 A | 7/2017 |
| CN | 107024756 A | 8/2017 |
| CN | 107102425 A | 8/2017 |
| CN | 107167897 A | 9/2017 |
| CN | 107167902 A | 9/2017 |
| CN | 206460205 U | 9/2017 |
| CN | 107290843 A | 10/2017 |
| CN | 206946078 U | 1/2018 |
| CN | 107703609 A | 2/2018 |
| CN | 107831588 A | 3/2018 |
| CN | 207164341 U | 3/2018 |
| CN | 107976770 A | 5/2018 |
| CN | 108089278 A | 5/2018 |
| CN | 108089317 A | 5/2018 |
| CN | 207424362 U | 5/2018 |
| CN | 207424363 U | 5/2018 |
| CN | 108107548 A | 6/2018 |
| CN | 108227146 A | 6/2018 |
| CN | 207557562 U | 6/2018 |
| CN | 108459394 A | 8/2018 |
| CN | 108761745 A | 11/2018 |
| CN | 108873250 A | 11/2018 |
| CN | 109283665 A | 1/2019 |
| CN | 109375346 A | 2/2019 |
| CN | 208506348 U | 2/2019 |
| CN | 109407267 A | 3/2019 |
| CN | 109725406 A | 5/2019 |
| CN | 109752823 A | 5/2019 |
| CN | 109814234 A | 5/2019 |
| CN | 109814235 A | 5/2019 |
| CN | 208833988 U | 5/2019 |
| CN | 208872939 U | 5/2019 |
| CN | 208888449 U | 5/2019 |
| CN | 109870786 A | 6/2019 |
| CN | 109870788 A | 6/2019 |
| CN | 109917533 A | 6/2019 |
| CN | 110018556 A | 7/2019 |
| CN | 209070186 U | 7/2019 |
| CN | 110109226 A | 8/2019 |
| CN | 110208927 A | 9/2019 |
| CN | 110261997 A | 9/2019 |
| CN | 110398815 A | 11/2019 |
| CN | 110426822 A | 11/2019 |
| CN | 110531500 A | 12/2019 |
| CN | 110568583 A | 12/2019 |
| CN | 110618522 A | 12/2019 |
| CN | 209765129 U | 12/2019 |
| CN | 110646919 A | 1/2020 |
| CN | 110646921 A | 1/2020 |
| CN | 110794555 A | 2/2020 |
| CN | 110879454 A | 3/2020 |
| CN | 111007649 A | 4/2020 |
| CN | 111025600 A | 4/2020 |
| CN | 111308688 A | 6/2020 |
| CN | 111338057 A | 6/2020 |
| CN | 210720853 U | 6/2020 |
| CN | 111399186 A | 7/2020 |
| CN | 211786331 U | 10/2020 |
| JP | 2008268977 A | 11/2008 |
| JP | 2013235242 A | 11/2013 |
| KR | 1020140135909 A | 11/2014 |
| TW | 201350956 A | 12/2013 |
| TW | I625567 B | 6/2018 |
| TW | I640811 B | 11/2018 |
| TW | I655474 B | 4/2019 |
| WO | 2003046633 A2 | 6/2003 |
| WO | 2014162779 A1 | 10/2014 |
| WO | 2015159721 A1 | 10/2015 |
| WO | 2017180362 A1 | 10/2017 |
| WO | 2020073978 A1 | 4/2020 |
| WO | 2020220444 A1 | 11/2020 |
| WO | 2020258269 A1 | 12/2020 |
| WO | 2021026869 A1 | 2/2021 |
| WO | 2021072745 A1 | 4/2021 |
| WO | 2021087661 A1 | 5/2021 |
| WO | 2021087669 A1 | 5/2021 |
| WO | 2021102943 A1 | 6/2021 |
| WO | 2021109127 A1 | 6/2021 |
| WO | 2021138754 A1 | 7/2021 |
| WO | 2021179207 A1 | 9/2021 |
| WO | 2021184164 A1 | 9/2021 |
| WO | 2021184165 A1 | 9/2021 |
| WO | 2021184167 A1 | 9/2021 |
| WO | 2021203277 A1 | 10/2021 |
| WO | 2021217504 A1 | 11/2021 |
| WO | 2021217664 A1 | 11/2021 |

OTHER PUBLICATIONS

U.S. Appl. No. 17/284,467, filed Apr. 11, 2021, in the name of Jiangxi Jingchao Optical Co. Ltd.

International Search Report on International Patent Application PCT/CN2019/100747, filed Aug. 8, 2019, in the name of Jiangxi Jingchao Optical Co. Ltd.

(56) References Cited

OTHER PUBLICATIONS

U.S. Appl. No. 17/601,075, filed Oct. 3, 2021, in the name of Jiangxi Jingchao Optical Co. Ltd.
International Search Report dated Mar. 27, 2019 on International Patent Application PCT/CN2020/072135, filed Jan. 15, 2020, in the name of Jiangxi Jingchao Optical Co. Ltd.
U.S. Appl. No. 17/440,786, filed Sep. 19, 2021, in the name of Jiangxi Jingchao Optical Co. Ltd.
U.S. Appl. No. 17/605,985, filed Oct. 22, 2021, in the name of OFilm Group Co. Ltd. and Jiangxi Jingchao Optical Co. Ltd.
International Search Report on International Patent Application PCT/CN2019/115349, filed Dec. 4, 2019, in the name of Jiangxi Jingchao Optical Co. Ltd.
U.S. Appl. No. 17/606,005, Oct. 22, 2021, in the name of Jiangxi Jingchao Optical Co. Ltd.
International Search Report on International Patent Application PCT/CN2019/093780, filed Jun. 28, 2019, in the name of Jiangxi Jingchao Optical Co. Ltd.
U.S. Appl. No. 17/605,537, filed Oct. 22, 2021, in the name of Jiangxi Jingchao Optical Co. Ltd.
International Search Report dated Apr. 30, 2019 on International Patent Application PCT/CN2019/091801 filed Jun. 19, 2019, in the name of Jiangxi Jingchao Optical Co. Ltd.
U.S. Appl. No. 17/604,739, filed Oct. 18, 2021, in the name of Jiangxi Jingchao Optical Co. Ltd.
International Search Report on International Patent Application PCT/CN2019/122072, filed Nov. 29, 2019, in the name of Jiangxi Jingchao Optical Co. Ltd.
U.S. Appl. No. 17/606,027, filed Oct. 23, 2021, in the name of Jiangxi Jingchao Optical Co. Ltd.
International Search Report on International Patent Application PCT/CN2019/111957, filed Oct. 18, 2019, in the name of Jiangxi Jingchao Optical Co. Ltd.
U.S. Appl. No. 17/606,040, filed Oct. 24, 2021, in the name of Jiangxi Jingchao Optical Co. Ltd.
International Search Report dated Nov. 4, 2019 on International Patent Application PCT/CN2019/115318 filed Jul. 1, 2020, in the name of Jiangxi Jingchao Optical Co. Ltd.
U.S. Appl. No. 17/606,359, filed Oct. 25, 2021, in the name of Jiangxi Jingchao Optical Co. Ltd.
International Search Report on International Patent Application PCT/CN2020/079517, filed Mar. 16, 2020, in the name of Jiangxi Jingchao Optical Co. Ltd.
U.S. Appl. No. 17/609,381, filed Nov. 6, 2021, in the name of Jiangxi Jingchao Optical Co. Ltd.
International Search Report dated Jul. 16, 2020 on International Patent Application PCT/CN2019/123679 filed Aug. 25, 2020, in the name of Jiangxi Jingchao Optical Co. Ltd.
U.S. Appl. No. 17/610,693, filed Nov. 11, 2021, in the name of Jiangxi Jingchao Optical Co. Ltd.
International Search Report on International Patent Application PCT/CN2020/070404, filed Jan. 6, 2020, in the name of Jiangxi Jingchao Optical Co. Ltd.
U.S. Appl. No. 17/440,691, filed Sep. 17, 2021, in the name of Jiangxi Jingchao Optical Co. Ltd.
International Search Report dated Dec. 16, 2020 on International Patent Application PCT/CN2020/079515 filed Dec. 23, 2020, in the name of Jiangxi Jingchao Optical Co. Ltd.
U.S. Appl. No. 17/611,148, filed Nov. 13, 2021, in the name of Jiangxi Jingchao Optical Co. Ltd.
International Search Report on International Patent Application PCT/CN2020/087819, filed Apr. 29, 2020, in the name of Jiangxi Jingchao Optical Co. Ltd.
U.S. Appl. No. 17/611,162, filed Nov. 14, 2021, in the name of Jiangxi Jingchao Optical Co. Ltd.
International Search Report on International Patent Application PCT/CN2020/079526, filed Mar. 16, 2020, in the name of Jiangxi Jingchao Optical Co. Ltd.
U.S. Appl. No. 17/611,165, filed Nov. 14, 2021, In the name of Jiangxi Jingchao Optical Co. Ltd.
International Search Report dated Nov. 3, 2020 on International Patent Application PCT/CN2020/078814 filed Nov. 26, 2020, in the name of Jiangxi Jingchao Optical Co. Ltd.
U.S. Appl. No. 17/611,569, filed Nov. 16, 2021, in the name of Jiangxi Jingchao Optical Co. Ltd.
International Search Report on International Patent Application PCT/CN2020/083697, filed Apr. 8, 2020, in the name of Jiangxi Jingchao Optical Co. Ltd.
U.S. Appl. No. 17/614,359, filed Nov. 25, 2021, in the name of Jiangxi Jingchao Optical Co. Ltd.
International Search Report on International Patent Application PCT/CN2020/088515, filed Apr. 30, 2020, in the name of Jiangxi Jingchao Optical Co. Ltd.
U.S. Appl. No. 17/614,499, filed Nov. 26, 2021, in the name of OFilm Group Co. Ltd. and Jiangxi Jingchao Optical Co. Ltd.
U.S. Appl. No. 17/536,006, filed Nov. 27, 2021, in the name of Jiangxi Jingchao Optical Co. Ltd.
U.S. Appl. No. 17/536,010, filed Nov. 27, 2021, in the name of Jiangxi Jingchao Optical Co. Ltd.

* cited by examiner

OPTICAL SYSTEM, IMAGE CAPTURING MODULE, AND ELECTRONIC DEVICE

CROSS REFERENCE TO RELATED APPLICATIONS

This application is a national stage, filed under 35 U.S.C. § 371, of International Application No. PCT/CN2020/103797, filed on Jul. 23, 2020, and entitled "Optical system, image capturing module, and electronic device", the content of which is incorporated herein in entirety by reference.

TECHNICAL FIELD

The present disclosure relates to the field of photography, and in particular, to an optical system, an image capturing module, and an electronic device.

BACKGROUND

With the development of photographing technology, people have increasingly high requirements on photographing functions of a photographing device, and have also higher requirements on the field of view while pursuing high imaging quality. The larger the maximum field of view of the photographing device is, the more information can be acquired during photographing, thereby improving the photographing efficiency. However, in current photographing devices, when the optical system has a large field of view, it is difficult to balance the wide-angle characteristic and astigmatism, that is, astigmatism is generally large while the optical system has a large field of view, which affects the imaging quality of the optical system.

SUMMARY

According to various embodiments of the present disclosure, an optical system, an image capturing module, and an electronic device are provided.

An optical system, sequentially from an object side to an image side, includes:

a stop;
a first lens having a positive refractive power, an object side surface of the first lens being convex at a paraxial area;
a second lens having a refractive power;
a third lens having a refractive power;
a fourth lens having a refractive power;
a fifth lens having a refractive power;
a sixth lens having a positive refractive power, an image side surface of the sixth lens being convex at a paraxial area;
a seventh lens having a refractive power; and
an eighth lens having a refractive power, an image side surface of the eighth lens being concave at a paraxial area;
wherein the optical system satisfies the following condition:

(MIN6*MAX8/MAX6*MIN8)≤2;

wherein within a maximum effective aperture of the sixth lens, MIN6 is a minimum thickness of the sixth lens in a direction parallel to an optical axis, and MAX6 is a maximum thickness of the sixth lens in the direction parallel to the optical axis; within a maximum effective aperture of the eighth lens, MIN8 is a minimum thickness of the eighth lens in the direction parallel to the optical axis, and MAX8 is a maximum thickness of the eighth lens in the direction parallel to the optical axis.

An image capturing module includes a photosensitive element and the optical system as described above, the photosensitive element is arranged on the image side of the optical system, and light passes through the optical system to form an image on the photosensitive element.

An electronic device includes a housing and the image capturing module as described above, the image capturing module is disposed in the housing.

The details of one or more embodiments of the present disclosure are set forth in the accompanying drawings and the description below. Other features, objects and advantages of the present disclosure will become apparent from the description, the accompanying drawings, and the claims.

BRIEF DESCRIPTION OF THE DRAWINGS

To better describe and illustrate embodiments and/or examples of the disclosure disclosed herein, reference can be made to one or more accompanying drawings. The additional details or examples used to describe the accompanying drawings should not be construed as limiting the scope of any of the disclosed disclosure, the presently described embodiments and/or examples, and the presently understood preferred mode of the disclosure.

DETAILED DESCRIPTION OF THE EMBODIMENTS

Figure 1:
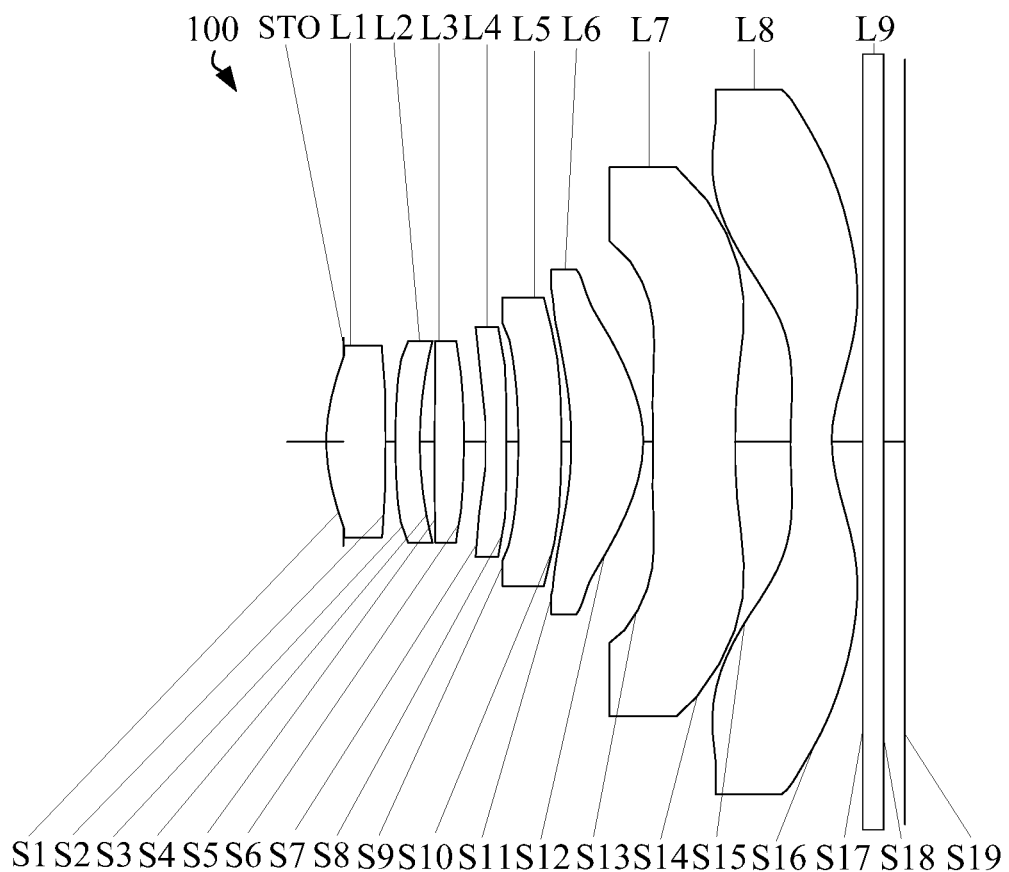
FIG. 1 is a schematic view of an optical system according to a first embodiment of the present disclosure.

In order to make the above objects, features and advantages of the present disclosure more obvious and understandable, the specific embodiments of the present disclosure will be illustrated in detail below in conjunctions with the accompanying drawings. In the following description, many specific details are set forth in order to assist readers in fully understanding the present disclosure. However, the present disclosure can be implemented in many other ways than described herein, and those skilled in the art can make similar improvements without departing from the connotation of the present disclosure. Therefore, the present disclosure is not limited by the specific embodiments disclosed below.

In the description of the present disclosure, it should be understood that orientation or positional relationships indicated by terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on orientation or positional relationship shown in the drawings, which are merely to facilitate the description of the present disclosure and simplify the description, not to indicate or imply that the device or elements must have a particular orientation, be constructed and operated in a particular orientation, and therefore cannot be construed as a limitation on the present disclosure.

In addition, the terms "first" and "second" are used for description only, and cannot be understood as indicating or implying relative importance or implicitly indicating the number of technical features described. Thus, the features defined with "first" and "second" may include at least one of the features explicitly or implicitly. In the description of the present disclosure, the meaning of "plurality" is at least two, such as two, three, etc., unless explicitly defined otherwise.

In the present disclosure, unless explicitly specified and limited otherwise, the terms "mounting", "connecting", "connected", "fixed" and the like should be understood in a broad sense. For example, it may be a fixed connection or a detachable connection, or an integration, may be a mechanical connection or electrical connection, may be a direct connection, or may be an indirect connection through an intermediate medium, may be the connection between two elements or the interaction relationship between two elements, unless explicitly defined otherwise. The specific meanings of the above terms in the present disclosure can be understood by one of those ordinary skills in the art according to specific circumstances.

In the present disclosure, unless explicitly specified and limited otherwise, the first feature being "on" or "below" the second feature may be that the first and second features are in a direct contact, or the first and second features are in an indirectly contact through an intermediate medium. Moreover, the first feature being "over", "above" and "on" the second feature may be that the first feature is directly above or obliquely above the second feature, or simply means that the first feature is higher than the second feature in horizontal direction. The first feature being "beneath", "under", and "below" the second feature may be that the first feature is directly below or obliquely below the second feature, or simply means that the first feature is lower than the second feature in horizontal direction.

It should be noted that when an element is referred to as being "fixed" or "provided on" another element, it may be directly on another element or there may also be an intermediate element therebetween. When an element is considered to be "connected" to another element, it may be directly connected to another element or there may be an intermediate element therebetween. As used herein, the terms "vertical", "horizontal", "upper", "lower", "left", "right", and similar expressions are for illustration only and are not meant to be the only embodiments.

Referring to FIG. 1, in some embodiments of the present disclosure, an optical system 100 includes, sequentially from an object side to an image side, a first lens L1, a second lens L2, a third lens L3, a fourth lens L4, a fifth lens L5, a sixth lens L6, a seventh lens L7, and an eighth lens L8. Specifically, the first lens L1 includes an object side surface S1 and an image side surface S2. The second lens L2 includes an object side surface S3 and an image side surface S4. The third lens L3 includes an object side surface S5 and an image side surface S6. The fourth lens L4 includes an object side surface S7 and an image side surface S8. The fifth lens L5 includes an object side surface S9 and an image side surface S10. The sixth lens L6 includes an object side surface S11 and an image side surface S12. The seventh lens L7 includes an object side surface S13 and an image side surface S14. The eighth lens L8 includes an object side surface S15 and an image side surface S16.

The first lens L1 has a positive refractive power, which helps to shorten the total length of the optical system 100. In addition, the object side surface S1 of the first lens L1 is convex at a paraxial area, so that the positive refractive power of the first lens L1 can be further enhanced, and the size of the optical system 100 in a direction of an optical axis becomes shorter, which is beneficial to the miniaturization design of the optical system 100. The second lens L2, the third lens L3, the fourth lens L4, the fifth lens L5, and the seventh lens L7 all have refractive power. The sixth lens L6 has a positive refractive power, and the image side surface S12 of the sixth lens L6 is convex at a paraxial area. The eighth lens L8 has a refractive power, and the image side surface S16 of the eighth lens L8 is concave at a paraxial area.

In addition, in some embodiments, the optical system 100 is provided with a stop STO, and the stop STO may be arranged on an object side of the first lens L1. In some embodiments, the optical system 100 further includes an infrared filter L9 arranged on an image side of the eighth lens L8, and the infrared filter L9 includes an object side surface S17 and an image side surface S18. Further, the optical system 100 further includes an image plane S19 located on the image side of the eighth lens L8. The image plane S19 is an imaging plane of the optical system 100, and incident light can be imaged on the image plane S19 after being adjusted by the first lens L1, the second lens L2, the third lens L3, the fourth lens L4, the fifth lens L5, the sixth lens L6, the seventh lens L7, and the eighth lens L8. It should be noted that the infrared filter L9 may be an infrared cut-off filter, and is used to filter out interference light and prevent the interference light from reaching the image plane S19 of the optical system 100 and affecting normal imaging.

In some embodiments, the object side surface and the image side surface of each lens of the optical system 100 are aspherical. The adoption of the aspherical structure can improve the flexibility of lens design, effectively correct spherical aberration, and improve imaging quality. In other embodiments, the object side surface and the image side surface of each lens of the optical system 100 may also be spherical. It should be noted that the aforementioned embodiments are merely examples of some embodiments of the present disclosure, and in some embodiments, the surface of each lens in the optical system 100 may be any combination of aspherical or spherical surfaces.

In some embodiment, the lenses in the optical system 100 may be made of glass or plastic. The lens made of plastic can reduce the weight of the optical system 100 and reduce production cost, which is matched with the smaller size of the optical system to achieve a light and miniaturized design of the optical system. The lens made of glass enables the optical system 100 to have excellent optical performance and high temperature resistance. It should be noted that the lenses in the optical system 100 may also be made of any combination of glass and plastic, and are not necessarily all made of glass or plastic.

It should be noted that, the first lens L1 does not mean that only one lens is present, and in some embodiments, two or more lenses may also be present in the first lens L1. The two or more lenses can form a cemented lens, and a surface of the cemented lens closest to the object side can be regarded as the object side surface S1, and a surface thereof closest to the image side can be regarded as the image side surface S2. Alternatively, although no cemented lens is formed between the lenses of the first lens L1, a distance between the lenses is relatively fixed, and in this case, the object side surface of the lens closest to the object side is the object side surface S1, and the image side surface of the lens closest to the image side is the image side surface S2. In addition, the number of lenses in the second lens L2, the third lens L3, the fourth lens L4, the fifth lens L5, the sixth lens L6, the seventh lens L7, or the eighth lens L8 in some embodiments may also be greater than or equal to two, and a cemented lens may be formed between any adjacent lenses, or a non-cemented lens may also be formed.

In addition, in some embodiments, the optical system 100 satisfies the condition: (MIN6*MAX8/MAX6*MIN8)≤2; where, within a maximum effective aperture of the sixth lens L6, MIN6 is a minimum thickness of the sixth lens L6 in a direction parallel to the optical axis, and MAX6 is a maximum thickness of the sixth lens L6 in the direction parallel to the optical axis; within a maximum effective aperture of the eighth lens L8, MIN8 is a minimum thickness of the eighth lens L8 in the direction parallel to the optical axis, and MAX8 is a maximum thickness of the eighth lens L8 in the direction parallel to the optical axis. Specifically, (MIN6*MAX8/MAX6*MIN8) may be 0.810, 0.885, 0.912, 0.963, 1.058, 1.132, 1.297, 1.326, 1.455, or 1.573. When the above condition is satisfied, the thicknesses of the sixth lens L6 and the eighth lens L8 can be reasonably configured to balance the wide-angle characteristic and astigmatism, so that the astigmatism is not too large while the optical system 100 has a large field of view, thereby ensuring that the optical system 100 has excellent imaging quality. In addition, the injection molding yields of the sixth lens L6 and the eighth lens L8 during the production process can also be improved, thereby reducing the production cost. Further, in some embodiments, the optical system 100 satisfies the condition: 0.81≤(MIN6*MAX8/MAX6*MIN8)≤1.57. When the above condition is satisfied, the large field of view and astigmatism of the optical system 100 can be better balanced, and the injection molding yields of the sixth lens L6 and the eighth lens L8 are also higher.

In some embodiments, the optical system 100 satisfies the condition: (SAG61+SAG62)/(SAG71+SAG72)≤2; where, SAG61 is a distance in the direction parallel to the optical axis from an intersection of the object side surface S11 of the sixth lens L6 and the optical axis to a position of a maximum effective radius of the object side surface S11 of the sixth lens L6, SAG62 is a distance in the direction parallel to the optical axis from an intersection of the image side surface S12 of the sixth lens L6 and the optical axis to a position of a maximum effective radius of the image side surface S12 of the sixth lens L6, SAG71 is a distance in the direction parallel to the optical axis from an intersection of the object side surface S13 of the seventh lens L7 and the optical axis to a position of a maximum effective radius of the object side surface S13 of the seventh lens L7, and SAG72 is a distance in the direction parallel to the optical axis from an intersection of the image side surface S14 of the seventh lens L7 and the optical axis to a position of a maximum effective radius of the image side surface S14 of the seventh lens L7. Specifically, (SAG61+SAG62)/(SAG71+SAG72) may be 0.498, 0.556, 0.628, 0.795, 0.835, 0.966, 0.987, 1.023, 1.165, or 1.243. When the above condition is satisfied, the sixth lens L6 and the seventh lens L7 can be reasonably configured to reduce the influence of the tolerances generated in the injection molding process of the sixth lens L6 and the seventh lens L7 and the influence of the tolerance generated in the lens barrel molding process on the imaging quality of the optical system 100 during assembly. In addition, it is also beneficial to balance the wide-angle characteristic and distortion of the optical system 100, so that the distortion is not too large while the optical system 100 has a large field of view, thereby ensuring that the optical system 100 has excellent imaging quality. Further, in some embodiments, the optical system 100 satisfies the condition: 0.5≤(SAG61+SAG62)/(SAG71+SAG72)≤1.24. When the above condition is satisfied, the large field of view and distortion of the optical system 100 can be better balanced, and the influence of the tolerances generated in the injection molding process of the sixth lens L6 and the seventh lens L7 on the imaging quality of the optical system 100 can be further reduced.

In some embodiments, the optical system 100 satisfies the condition: 0≤Y71−Y62≤1; where Y62 is the maximum effective aperture of the image side surface S12 of the sixth lens L6, and Y71 is the maximum effective aperture of the object side surface S13 of the seventh lens L7. Specifically, Y71−Y62 may be 0.101, 0.159, 0.214, 0.239, 0.357, 0.369, 0.412, 0.475, 0.503, or 0.512, in a numerical unit of mm. When the above condition is satisfied, the sixth lens L6 and the seventh lens L7 can be reasonably configured, so that the structure of the optical system 100 is more compact to satisfy the requirements of miniaturization design, and the optical system 100 has a larger field of view. In addition, the optical system 100 has a more compact structure, which can make the air space between the sixth lens L6 and the seventh lens L7 at the edges thereof is shorter, so that a pressing sheet between the sixth lens L6 and the seventh lens L7 can be omitted, thereby reducing the generation of stray light, and improving the imaging quality of the optical system 100. Further, in some embodiments, the optical system 100 satisfies the condition: 0.1≤Y71−Y62≤0.51. When the above condition is satisfied, the optical system 100 is easier to achieve effects of a miniaturization design and a large field of view, and the imaging quality of the optical system 100 is also better.

In some embodiments, the optical system 100 satisfies the condition: 3≤100*ΣCT/FOV≤5; where ECT is a sum of thicknesses of the first lens L1, the second lens L2, the third lens L3, the fourth lens L4, the fifth lens L5, the sixth lens L6, the seventh lens L7, and the eighth lens L8 on the optical axis, and the FOV is a maximum field of view of the optical system 100. Specifically, 100*ΣCT/FOV may be 3.042, 3.189, 3.252, 3.561, 3.675, 3.852, 4.023, 4.567, 4.711, or 4.926, in a numerical unit of mm/degrees. When the above condition is satisfied, the wide-angle characteristic and the thickness of each lens in the optical system 100 on the optical axis can be balanced, so that the optical system 100 can have a short total system length while having a large field of view. Further, in some embodiments, the optical system 100 satisfies the condition: 3.04≤100*ΣCT/FOV≤4.93. When the above condition is satisfied, the large field of view and the thickness of each lens in the optical system 100 on the optical axis can be better balanced.

In some embodiments, the optical system 100 satisfies the condition: 0≤(CT7+CT8)/CT6≤2; where CT6 is a thickness of the sixth lens L6 on the optical axis, CT7 is a thickness of the seventh lens L7 on the optical axis, and CT8 is a thickness of the eighth lens L8 on the optical axis. Specifically, (CT7+CT8)/CT6 may be 0.883, 0.935, 1.028, 1.136, 1.298, 1.374, 1.432, 1.521, 1.693, or 1.707. When the above condition is satisfied, the thicknesses of the sixth lens L6, the seventh lens L7, and the eighth lens L8 on the optical axis can be reasonably configured to balance the wide-angle characteristic and the aberration of the optical system 100, so that the aberration is not too large while the optical system 100 has a large field of view, thereby ensuring that the optical system 100 has excellent imaging quality. Further, in some embodiments, the optical system 100 satisfies the condition: 0.88≤(CT7+CT8)/CT6≤1.71. When the above condition is satisfied, the large field of view and the aberration of the optical system 100 can be better balanced.

In some embodiments, the optical system 100 satisfies the condition: (ET2+ET3)/(CT2+CT3)≤1; where, ET2 is a distance in the direction parallel to the optical axis from a maximum effective aperture of the object side surface S3 of the second lens L2 to a maximum effective aperture of the image side surface S4 of the second lens L2, ET3 is a distance in the direction parallel to the optical axis from a maximum effective aperture of the object side surface S5 of the third lens L3 to a maximum effective aperture of the image side surface S6 of the third lens, and CT2 is a thickness of the second lens L2 on the optical axis, and CT3 is a thickness of the third lens L3 on the optical axis. Specifically, (ET2+ET3)/(CT2+CT3) may be 0.831, 0.845, 0.856, 0.869, 0.872, 0.883, 0.895, 0.918, 0.925 or 0.938. When the above condition is satisfied, the thicknesses of the second lens L2 and the third lens L3 can be reasonably configured, which is advantageous for achieving the effect of a large field of view. In addition, the deflection angle of the light passing through the second lens L2 and the third lens L3 can be made smaller, so as to reduce the generation of stray light in the optical system 100 and improve the imaging quality of the optical system 100. Moreover, the sensitivities of the second lens L2 and the third lens L3 can also be reduced, which is beneficial to the injection molding and assembly of the second lens L2 and the third lens L3 and improving the injection molding yields of the second lens L2 and the third lens L3, so that the production costs of the second lens L2 and the third lens L3 are reduced. Further, in some embodiments, the optical system 100 satisfies the condition: 0.83≤(ET2+ET3)/(CT2+CT3)≤0.94. When the above condition is satisfied, the optical system 100 has better large field of view effect and better imaging quality, and the injection molding yields of the second lens L2 and the third lens L3 are also higher.

In some embodiments, the optical system 100 satisfies the condition: 1≤TTL/f≤2; where, TTL is a distance from the object side surface S1 of the first lens L1 to the imaging plane of the optical system 100 on the optical axis, and f is a total effective focal length of the optical system 100. Specifically, TTL/f may be 1.312, 1.335, 1.357, 1.369, 1.387, 1.401, 1.425, 1.453, 1.462, or 1.478. When the above condition is satisfied, the total system length and the total effective focal length of the optical system 100 can be configured reasonably, so as to shorten the total system length of the optical system 100 and achieve a miniaturization design. Further, in some embodiments, the optical system 100 satisfies the condition: 1.31≤TTL/f≤1.48. When the above condition is satisfied, the optical system 100 is easier to achieve a miniaturization design.

In some embodiments, the optical system 100 satisfies the condition: 1≤TTL/ImgH≤2; where TTL is the distance from the object side surface S1 of the first lens L1 to the imaging plane of the optical system 100 on the optical axis, and ImgH is half of a diagonal length of an effective pixel area of the optical system 100 on the imaging plane. Specifically, TTL/ImgH may be 1.223, 1.253, 1.268, 1.295, 1.311, 1.375, 1.426, 1.487, 1.510, or 1.558. When the above condition is satisfied, it is advantageous to shorten the total system length of the optical system 100 to achieve a miniaturization design. Further, in some embodiments, the optical system 100 satisfies the condition: 1.22≤TTL/ImgH≤1.56. When the above condition is satisfied, the optical system 100 is easier to achieve a miniaturization design.

In some embodiments, the optical system 100 satisfies the condition: −10≤f67/f≤3; where f67 is a combined focal length of the sixth lens L6 and the seventh lens L7, and f is the total effective focal length of the optical system 100. Specifically, f67/f may be −9.584, −8.102, −6.564, −2.398, −0.325, 1.092, 1.157, 1.253, 1.374, or 1.401. When the above condition is satisfied, the combined focal length of the sixth lens L6 and the seventh lens L7 and the total effective focal length of the optical system 100 can be configured reasonably, so as to facilitate the correction of the spherical aberration generated by the off-axis light of the optical system 100 at different aperture positions, and further improve the imaging quality of the optical system 100. Further, in some embodiments, the optical system 100 satisfies the condition: −9.58≤f67/f≤1.4. When the above condition is satisfied, the imaging quality of the optical system 100 is better.

In some embodiments, the optical system 100 satisfies the condition: −23≤f4/f≤24; where, f4 is an effective focal length of the fourth lens L4, and f is the total effective focal length of the optical system 100. Specifically, f4/f may be −22.380, −20.528, −18.012, −15.320, −5.693, 0.368, 5.369, 10.471, 15.678, or 23.416. When the above condition is satisfied, the effective focal length of the fourth lens L4 and the total effective focal length of the optical system 100 can be reasonably configured to enlarge the maximum field of view of the optical system 100, thereby achieving an effect of a large field of view, and in addition, contributing to shortening the total system length of the optical system 100 and achieving a miniaturization design. Further, in some embodiments, the optical system 100 satisfies the condition: −22.38≤f4/f≤23.42. When the above condition is satisfied, the optical system 100 is easier to achieve an effect of a large field of view and a miniaturization design.

Moreover, in some embodiments, the optical system 100 satisfies the conditions: 3.43≤f≤4.75; 2.02≤FNO≤2.48; 78.36≤FOV≤97.5; ImgH=4.00; 4.89≤TTL≤6.23; where f is the total effective focal length of optical system 100 in unit of mm; FNO is an F-number of the optical system 100; FOV is the maximum field of view of the optical system 100 in unit of degree; ImgH is half of the diagonal length of the effective pixel area of the optical system 100 on the imaging plane, in unit of mm; and TTL is the distance on the optical axis from the object side surface S1 of the first lens L1 to the imaging plane of the optical system 100, in unit of mm.

In light of the foregoing description of the various embodiments, the following provides more detailed description of the embodiments and accompanying drawings.

First Embodiment

Figure 2:
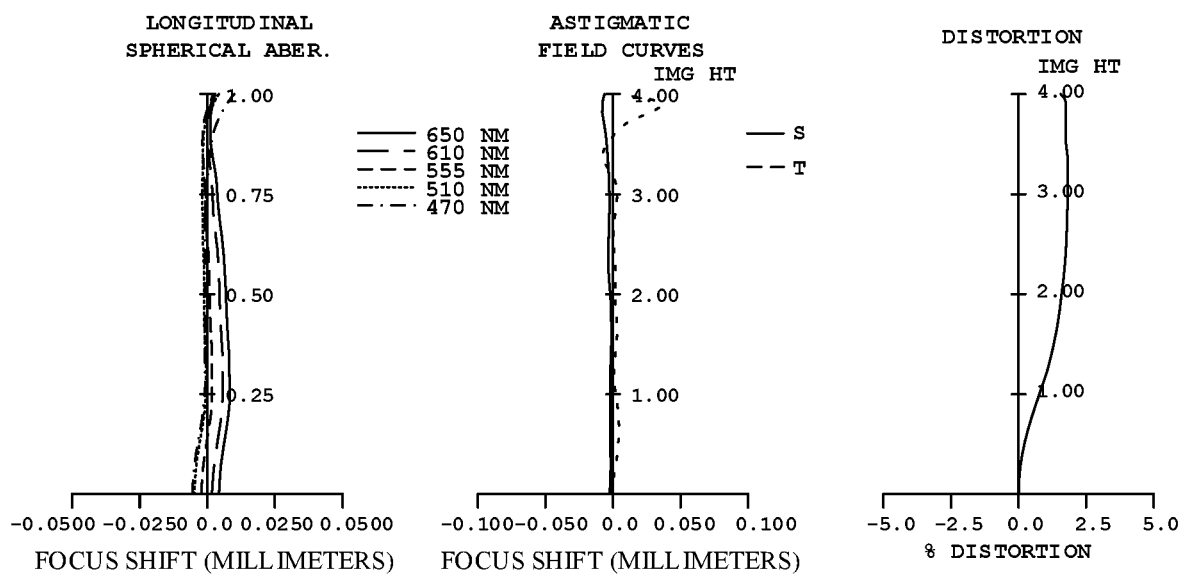
FIG. 2 is a graph showing spherical aberration, astigmatism, and distortion of the optical system according to the first embodiment of the present disclosure.

Referring to FIGS. 1 and 2, FIG. 1 is a schematic view of an optical system 100 according to the first embodiment. The optical system 100 includes, sequentially from an object side to an image side, a stop STO, a first lens L1 having a positive refractive power, a second lens L2 having a negative refractive power, a third lens L3 having a positive refractive power, a fourth lens L4 having a negative refractive power, a fifth lens L5 having a negative refractive power, a sixth lens L6 having a positive refractive power, a seventh lens L7 having a negative refractive power, and an eighth lens L8 having a negative refractive power. FIG. 2 is a graph showing spherical aberration, astigmatism, and distortion of the optical system 100 in the first embodiment sequentially from left to right. The astigmatism and distortion graphs are both graphs at a wavelength of 555 nm. Other embodiments are the same.

An object side surface S1 of the first lens L1 is convex at a paraxial area and convex at a circumference thereof.

An image side surface S2 of the first lens L1 is convex at a paraxial area and convex at a circumference thereof.

An object side surface S3 of the second lens L2 is convex at a paraxial area and convex at a circumference thereof.

An image side surface S4 of the second lens L2 is concave at a paraxial area and concave at a circumference thereof.

An object side surface S5 of the third lens L3 is convex at a paraxial area and concave at a circumference thereof.

An image side surface S6 of the third lens L3 is convex at a paraxial area and concave at a circumference thereof.

An object side surface S7 of the fourth lens L4 is concave at a paraxial area and concave at a circumference thereof.

An image side surface S8 of the fourth lens L4 is concave at a paraxial area and convex at a circumference thereof.

An object side surface S9 of the fifth lens L5 is concave at a paraxial area and concave at a circumference thereof.

An image side surface S10 of the fifth lens L5 is convex at a paraxial area and convex at a circumference thereof.

An object side surface S11 of the sixth lens L6 is concave at a paraxial area and concave at a circumference thereof.

An image side surface S12 of the sixth lens L6 is convex at a paraxial area and convex at a circumference thereof.

An object side surface S13 of the seventh lens L7 is concave at a paraxial area and concave at a circumference thereof.

An image side surface S14 of the seventh lens L7 is concave at a paraxial area and convex at a circumference thereof.

An object side surface S15 of the eighth lens L8 is convex at a paraxial area and convex at a circumference thereof.

An image side surface S16 of the eighth lens L8 is concave at a paraxial area and convex at a circumference thereof.

The object side surfaces and the image side surfaces of the first lens L1, the second lens L2, the third lens L3, the fourth lens L4, the fifth lens L5, the sixth lens L6, the seventh lens L7, and the eighth lens L8 are all aspherical.

It should be noted that, in the present disclosure, when describing that a surface of a lens is convex at a paraxial area (a central area of the side surface), it can be understood that an area of this surface of the lens near the optical axis is convex. When describing that a surface of a lens is concave at the circumference thereof, it can be understood that an area of this surface near the maximum effective radius is concave. For example, when the surface is convex at the optical axis and also convex at the circumference thereof, a shape of the surface in a direction from the center (the optical axis) to the edge may be completely convex, or the surface may be firstly transited from a convex shape at the center to a concave shape, and then become a convex surface at a position close to its maximum effective radius. These are only examples to illustrate various shapes and structures (concave-convex relationship) of the surface at the optical axis and the circumference, and the various shapes and structures (concave-convex relationship) of the surface are not fully described, but other situations can be derived from the above examples.

The first lens L1, the second lens L2, the third lens L3, the fourth lens L4, the fifth lens L5, the sixth lens L6, the seventh lens L7, and the eighth lens L8 are all made of plastic.

In addition, the optical system 100 satisfies the condition: (MIN6*MAX8/MAX6*MIN8)=1.402; where, MIN6 is a minimum thickness of the sixth lens L6 in a direction parallel to the optical axis, MAX6 is a maximum thickness of the sixth lens L6 in the direction parallel to the optical axis, MIN8 is a minimum thickness of the eighth lens L8 in the direction parallel to the optical axis, and MAX8 is a maximum thickness of the eighth lens L8 in the direction parallel to the optical axis. When the above condition is satisfied, the thicknesses of the sixth lens L6 and the eighth lens L8 can be reasonably configured to balance the wide-angle characteristic and astigmatism, so that the astigmatism is not too large while the optical system 100 has a large field of view, thereby ensuring that the optical system 100 has excellent imaging quality. In addition, the injection molding yields of the sixth lens L6 and the eighth lens L8 during the production process can also be improved, thereby reducing the production cost.

The optical system 100 satisfies the condition: (SAG61+SAG62)/(SAG71+SAG72)=0.852; where, SAG61 is a distance in the direction parallel to the optical axis from an intersection of the object side surface S11 of the sixth lens L6 and the optical axis to a position of a maximum effective radius of the object side surface S11 of the sixth lens L6, SAG62 is a distance in the direction parallel to the optical axis from an intersection of the image side surface S12 of the sixth lens L6 and the optical axis to a position of a maximum effective radius of the image side surface S12 of the sixth lens L6, SAG71 is a distance in the direction parallel to the optical axis from an intersection of the object side surface S13 of the seventh lens L7 and the optical axis to a position of a maximum effective radius of the object side surface S13 of the seventh lens L7, and SAG 72 is a distance in the direction parallel to the optical axis from an intersection of the image side surface S14 of the seventh lens L7 and the optical axis to a position of a maximum effective radius of the image side surface S14 of the seventh lens L7. When the above condition is satisfied, the sixth lens L6 and the seventh lens L7 can be reasonably configured to reduce the influence of the tolerances generated in the injection molding process of the sixth lens L6 and the seventh lens L7 and the influence of the tolerance generated in the lens barrel molding process on the imaging quality of the optical system 100 during assembly. In addition, it is also beneficial to balance the wide-angle characteristic and distortion of the optical system 100, so that the distortion is not too large while the optical system 100 has a large field of view, thereby ensuring that the optical system 100 has excellent imaging quality.

The optical system 100 satisfies the condition: Y71−Y62=0.303; where Y62 is the maximum effective aperture of the image side surface S12 of the sixth lens L6, and Y71 is the maximum effective aperture of the object side surface S13 of the seventh lens L7. When the above condition is satisfied, the sixth lens L6 and the seventh lens L7 can be reasonably configured, so that the structure of the optical system 100 is more compact to satisfy the requirements of miniaturization design, and the optical system 100 has a larger field of view. In addition, the optical system 100 has a more compact structure, which can make the air space between the sixth lens L6 and the seventh lens L7 at the edges thereof is shorter, so that a pressing sheet between the sixth lens L6 and the seventh lens L7 can be omitted, thereby reducing the generation of stray light, and improving the imaging quality of the optical system 100.

The optical system 100 satisfies the condition: 100*ΣCT/FOV=4.555; where ΣCT is a sum of thicknesses of the first lens L1, the second lens L2, the third lens L3, the fourth lens L4, the fifth lens L5, the sixth lens L6, the seventh lens L7, and the eighth lens L8 on the optical axis, and the FOV is a maximum field of view of the optical system 100. When the above condition is satisfied, the wide-angle characteristic and the thickness of each lens in the optical system 100 on the optical axis can be balanced, so that the optical system 100 can have a short total system length while having a large field of view.

The optical system 100 satisfies the condition: (CT7+CT8)/CT6=1.707; where CT6 is a thickness of the sixth lens L6 on the optical axis, CT7 is a thickness of the seventh lens L7 on the optical axis, and CT8 is a thickness of the eighth lens L8 on the optical axis. When the above condition is satisfied, the thicknesses of the sixth lens L6, the seventh lens L7, and the eighth lens L8 on the optical axis can be reasonably configured to balance the wide-angle characteristic and the aberration of the optical system 100, so that the aberration is not too large while the optical system 100 has a large field of view, thereby ensuring that the optical system 100 has excellent imaging quality.

The optical system 100 satisfies the condition: (ET2+ET3)/(CT2+CT3)=0.831; where, ET2 is a distance in the direction parallel to the optical axis from a maximum effective aperture of the object side surface S3 of the second lens L2 to a maximum effective aperture of the image side surface S4 of the second lens L2, ET3 is a distance in the direction parallel to the optical axis from a maximum effective aperture of the object side surface S5 of the third lens L3 to a maximum effective aperture of the image side surface S6 of the third lens L3, and CT2 is a thickness of the second lens L2 on the optical axis, and CT3 is a thickness of the third lens L3 on the optical axis. When the above condition is satisfied, the thicknesses of the second lens L2 and the third lens L3 can be reasonably configured, which is advantageous for achieving the effect of a large field of view. In addition, the deflection angle of the light passing through the second lens L2 and the third lens L3 can be made smaller, so as to reduce the generation of stray light in the optical system 100 and improve the imaging quality of the optical system 100. Moreover, the sensitivities of the second lens L2 and the third lens L3 can also be reduced, which is beneficial to the injection molding and assembly of the second lens L2 and the third lens L3 and improving the injection molding yields of the second lens L2 and the third lens L3, so that the production costs of the second lens L2 and the third lens L3 are reduced.

The optical system 100 satisfies the condition: TTL/f=1.353; where, TTL is a distance from the object side surface S1 of the first lens L1 to the imaging plane of the optical system 100 on the optical axis, and f is a total effective focal length of the optical system 100. When the above condition is satisfied, the total system length and the total effective focal length of the optical system 100 can be configured reasonably, so as to shorten the total system length of the optical system 100 and achieve a miniaturization design.

The optical system 100 satisfies the condition: TTL/ImgH=1.475; where TTL is the distance from the object side surface S1 of the first lens L1 to the imaging plane of the optical system 100 on the optical axis, and ImgH is half of a diagonal length of an effective pixel area of the optical system 100 on the imaging plane. When the above condition is satisfied, it is advantageous to shorten the total system length of the optical system 100 to achieve a miniaturization design.

The optical system 100 satisfies the condition: f67/f=1.352; where f67 is a combined focal length of the sixth lens L6 and the seventh lens L7, and f is the total effective focal length of the optical system 100. When the above condition is satisfied, the combined focal length of the sixth lens L6 and the seventh lens L7 and the total effective focal length of the optical system 100 can be configured reasonably, so as to facilitate the correction of the spherical aberration generated by the off-axis light of the optical system 100 at different aperture positions, and further improve the imaging quality of the optical system 100.

The optical system 100 satisfies the condition: f4/f=−3.456; where, f4 is an effective focal length of the fourth lens L4, and f is the total effective focal length of the optical system 100. When the above condition is satisfied, the effective focal length of the fourth lens L4 and the total effective focal length of the optical system 100 can be reasonably configured to enlarge the maximum field of view of the optical system 100, thereby achieving an effect of a large field of view, and in addition, contributing to shortening the total system length of the optical system 100 and achieving a miniaturization design.

In addition, various parameters of the optical system 100 are given in Table 1. Among them, the image plane S19 in Table 1 can be understood as the imaging plane of the optical system 100. The elements from an object plane (not shown in figures) to the image plane S19 are arranged in the order of the elements in Table 1 from top to bottom. The Y radius in Table 1 is a radius of curvature of the object side surface or image side surface indicated by corresponding surface number on the optical axis. The surface numbers 1 and 2 are the object side surface S1 and the image side surface S2 of the first lens L1, respectively. That is, in the same lens, a surface with the smaller surface number is an object side surface, and a surface with the larger surface number is an image side surface. The first value in the "thickness" parameter column of the first lens L1 is a thickness of the lens on the optical axis, and the second value therein is a distance on the optical axis from the image side surface of the lens to an object side surface of a rear lens in a direction towards the image side.

It should be noted that in this embodiment and the following embodiments, the optical system 100 may not be provided with the infrared filter L9, but in this case, a distance from the image side surface S16 of the eighth lens L8 to the image plane S19 is kept constant.

In the first embodiment, the total effective focal length of the optical system 100 is indicated by f, and f=4.36 mm. The F-number thereof is indicated by FNO, and FNO=2.36. The maximum field of view thereof is indicated by FOV, and FOV=83.2°.

In addition, the focal lengths, the refractive indexes, and the abbe numbers of the lenses are values at a wavelength of 555 nm, and the same applies to other embodiments.

TABLE 1

First Embodiment
f = 4.36 mm, FNO = 2.36, FOV = 83.2°

| Surface Number | Surface Name | Surface type | Y radius (mm) | Thickness (mm) | Material | Refractive index | Abbe number | Focal Length (mm) |
|---|---|---|---|---|---|---|---|---|
|  | Object Plane | Spherical | Infinite | 400.000 |  |  |  |  |
|  | Stop | Spherical | Infinite | −0.174 |  |  |  |  |
| 1 | First lens | Aspherical | 2.248 | 0.602 | Plastic | 1.54 | 56.1 | 4.02 |
| 2 |  | Aspherical | −87.247 | 0.100 |  |  |  |  |
| 3 | Second lens | Aspherical | 8.818 | 0.250 | Plastic | 1.53 | 55.8 | −18.46 |
| 4 |  | Aspherical | 4.62 | 0.151 |  |  |  |  |
| 5 | Third lens | Aspherical | 60.334 | 0.299 | Plastic | 1.53 | 55.8 | 18.46 |
| 6 |  | Aspherical | −11.835 | 0.221 |  |  |  |  |
| 7 | Fourth lens | Aspherical | −22.918 | 0.209 | Plastic | 1.67 | 20.4 | −15.07 |
| 8 |  | Aspherical | 18.482 | 0.124 |  |  |  |  |
| 9 | Fifth lens | Aspherical | −8.348 | 0.439 | Plastic | 1.64 | 23.8 | −30.47 |
| 10 |  | Aspherical | −14.891 | 0.100 |  |  |  |  |
| 11 | Sixth lens | Aspherical | −5.396 | 0.735 | Plastic | 1.53 | 55.8 | 3.60 |
| 12 |  | Aspherical | −1.492 | 0.100 |  |  |  |  |
| 13 | Seventh lens | Aspherical | −9.971 | 0.836 | Plastic | 1.67 | 20.4 | −8.98 |
| 14 |  | Aspherical | 16.124 | 0.565 |  |  |  |  |
| 15 | Eighth lens | Aspherical | 7.447 | 0.420 | Plastic | 1.53 | 55.8 | −3.88 |
| 16 |  | Aspherical | 1.597 | 0.315 |  |  |  |  |
| 17 | Infrared Filter | Spherical | Infinite | 0.210 | Glass | 1.52 | 64.2 |  |
| 18 |  | Spherical | Infinite | 0.221 |  |  |  |  |
| 19 | Image Plane | Spherical | Infinite | 0.000 |  |  |  |  |

Further, the aspherical coefficients of the image side surfaces or object side surfaces of the lenses of the optical system 100 are given in Table 2. The surface numbers from 1 to 16 represent the image side surfaces or the object side surfaces S1 to S16, respectively. K to A20 from top to bottom represent the types of aspherical coefficients, respectively. Among them, K represents a conic coefficient, A4 represents a quartic aspherical coefficient, A6 represents a sextic aspherical coefficient, and A8 represents an octal aspherical coefficient, and so on. In addition, the aspherical surface coefficient formula is as follows:

$$Z = \frac{cr^2}{1 + \sqrt{1 - (k+1)c^2 r^2}} + \sum_i A_i r^i$$

Where, Z is a distance from a corresponding point on an aspherical surface to a plane tangent to a vertex of the surface, r is a distance from the corresponding point on the aspherical surface to the optical axis, c is a curvature of the aspherical surface vertex, k is a conic coefficient, and Ai is a coefficient corresponding to a high-order term of the $i^{th}$ term in the aspherical surface shape formula.

TABLE 2

| | First Embodiment | | | | | |
|---|---|---|---|---|---|---|
| Surface number | 1 | 2 | 3 | 4 | 5 | 6 |
| K | −2.957E−01 | −9.900E+01 | 3.132E+01 | −4.388E−01 | −9.900E+01 | 2.751E+01 |
| A4 | −1.377E−02 | −2.285E−02 | −1.822E−03 | 1.979E−03 | 5.427E−03 | −2.332E−02 |
| A6 | 5.719E−03 | −2.048E−02 | 1.098E−02 | −6.780E−03 | 3.457E−02 | 4.111E−02 |
| A8 | −9.317E−02 | 1.272E−01 | 3.198E−02 | −5.046E−03 | −3.115E−01 | −1.532E−01 |
| A10 | 2.638E−01 | −5.666E−01 | −8.019E−02 | 2.393E−02 | 1.010E+00 | 9.344E−02 |
| A12 | −4.986E−01 | 1.477E+00 | 2.462E−01 | −7.732E−02 | −2.115E+00 | 3.327E−01 |
| A14 | 5.971E−01 | −2.285E+00 | −4.282E−01 | 2.282E−01 | 2.920E+00 | −8.657E−01 |
| A16 | −4.599E−01 | 2.060E+00 | 4.120E−01 | −3.327E−01 | −2.461E+00 | 9.850E−01 |
| A18 | 2.170E−01 | −9.892E−01 | −2.012E−01 | 2.263E−01 | 1.137E+00 | −5.732E−01 |
| A20 | −4.882E−02 | 1.936E−01 | 3.867E−02 | −5.904E−02 | −2.215E−01 | 1.381E−01 |
| Surface number | 7 | 8 | 9 | 10 | 11 | 12 |
| K | 4.699E+01 | −9.562E+01 | 3.700E+01 | 6.805E+01 | 3.436E+00 | −6.211E+00 |
| A4 | −1.466E−01 | −4.595E−02 | 8.143E−02 | −1.683E−02 | −1.306E−01 | −8.872E−02 |
| A6 | 3.641E−02 | −1.948E−01 | −3.763E−01 | 5.122E−03 | 3.740E−01 | 1.594E−01 |
| A8 | 3.720E−02 | 7.460E−01 | 8.434E−01 | −1.528E−02 | −5.396E−01 | −2.637E−01 |
| A10 | −4.173E−01 | −1.584E+00 | −1.215E+00 | 6.525E−03 | 5.162E−01 | 2.823E−01 |
| A12 | 7.926E−01 | 2.115E+00 | 1.188E+00 | 6.003E−03 | −3.547E−01 | −1.927E−01 |
| A14 | −7.350E−01 | −1.760E+00 | −7.562E−01 | −8.097E−03 | 1.729E−01 | 8.344E−02 |
| A16 | 3.899E−01 | 8.804E−01 | 2.876E−01 | 4.527E−03 | −5.500E−02 | −2.188E−02 |

TABLE 2-continued

| | First Embodiment | | | | | |
|---|---|---|---|---|---|---|
| A18 | −1.396E−01 | −2.423E−01 | −5.655E−02 | −1.271E−03 | 9.998E−03 | 3.148E−03 |
| A20 | 3.373E−02 | 2.847E−02 | 3.996E−03 | 1.397E−04 | −7.807E−04 | −1.906E−04 |

| Surface number | 13 | 14 | 15 | 16 |
|---|---|---|---|---|
| K | −2.706E+01 | 3.629E+00 | −1.390E+01 | −4.688E+00 |
| A4 | 1.715E−01 | 9.869E−02 | −8.107E−02 | −6.552E−02 |
| A6 | −1.905E−01 | −1.084E−01 | −4.851E−03 | 1.765E−02 |
| A8 | 1.036E−01 | 5.659E−02 | 9.180E−03 | −4.042E−03 |
| A10 | −3.035E−02 | −1.916E−02 | −2.268E−03 | 8.070E−04 |
| A12 | 1.368E−03 | 4.319E−03 | 2.714E−04 | −1.196E−04 |
| A14 | 2.242E−03 | −6.378E−04 | −1.674E−05 | 1.177E−05 |
| A16 | −7.895E−04 | 5.895E−05 | 3.897E−07 | −7.205E−07 |
| A18 | 1.146E−04 | −3.083E−06 | 7.902E−09 | 2.484E−08 |
| A20 | −6.433E−06 | 6.940E−08 | −4.266E−10 | −3.691E−10 |

Second Embodiment

Figure 3:
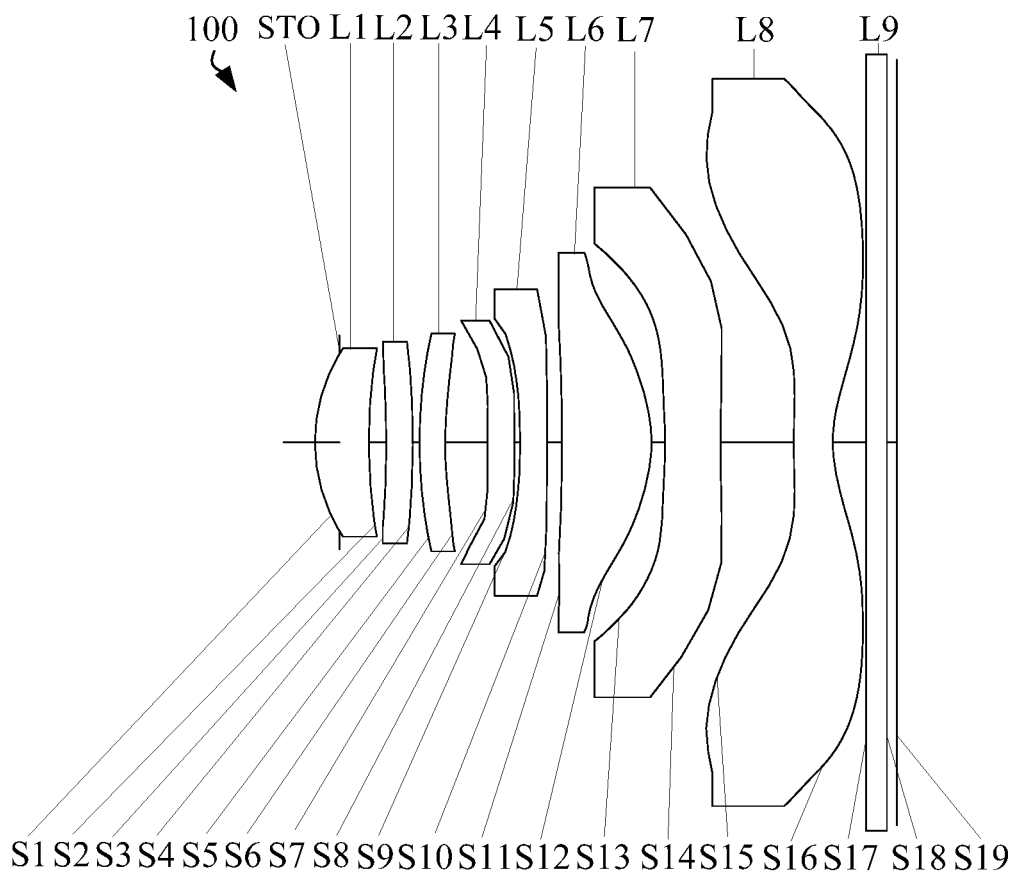
FIG. 3 is a schematic view of an optical system according to a second embodiment of the present disclosure.
Figure 4:
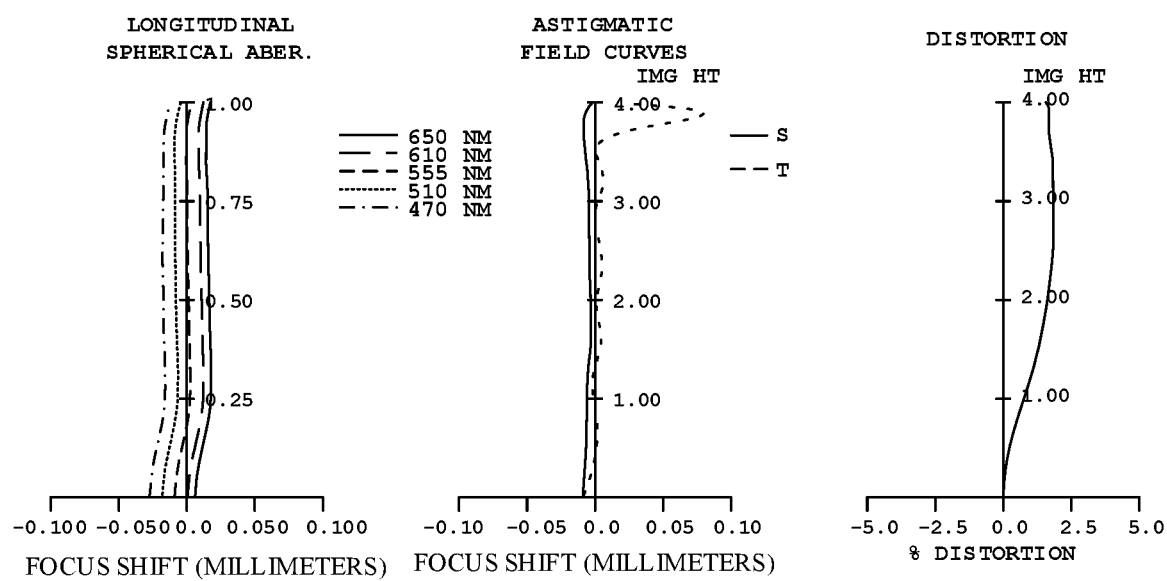
FIG. 4 is a graph showing spherical aberration, astigmatism, and distortion of the optical system according to the second embodiment of the present disclosure.

Referring to FIGS. 3 and 4, FIG. 3 is a schematic view of an optical system 100 according to the second embodiment. The optical system 100 includes, sequentially from an object side to an image side, a stop STO, a first lens L1 having a positive refractive power, a second lens L2 having a positive refractive power, a third lens L3 having a negative refractive power, a fourth lens L4 having a positive refractive power, a fifth lens L5 having a negative refractive power, a sixth lens L6 having a positive refractive power, a seventh lens L7 having a negative refractive power, and an eighth lens L8 having a negative refractive power. FIG. 4 is a graph showing spherical aberration, astigmatism, and distortion of the optical system 100 in the second embodiment sequentially from left to right.

An object side surface S1 of the first lens L1 is convex at a paraxial area and convex at a circumference thereof.

An image side surface S2 of the first lens L1 is concave at a paraxial area and concave at a circumference thereof.

An object side surface S3 of the second lens L2 is concave at a paraxial area and convex at a circumference thereof.

An image side surface S4 of the second lens L2 is convex at a paraxial area and convex at a circumference thereof.

An object side surface S5 of the third lens L3 is convex at a paraxial area and convex at a circumference thereof.

An image side surface S6 of the third lens L3 is concave at a paraxial area and concave at a circumference thereof.

An object side surface S7 of the fourth lens L4 is convex at a paraxial area and concave at a circumference thereof.

An image side surface S8 of the fourth lens L4 is concave at a paraxial area and convex at a circumference thereof.

An object side surface S9 of the fifth lens L5 is concave at a paraxial area and concave at a circumference thereof.

An image side surface S10 of the fifth lens L5 is concave at a paraxial area and convex at a circumference thereof.

An object side surface S11 of the sixth lens L6 is convex at a paraxial area and concave at a circumference thereof.

An image side surface S12 of the sixth lens L6 is convex at a paraxial area and convex at a circumference thereof.

An object side surface S13 of the seventh lens L7 is concave at a paraxial area and concave at a circumference thereof.

An image side surface S14 of the seventh lens L7 is convex at a paraxial area and concave at a circumference thereof.

An object side surface S15 of the eighth lens L8 is convex at a paraxial area and convex at a circumference thereof.

An image side surface S16 of the eighth lens L8 is concave at a paraxial area and convex at a circumference thereof.

The object side surfaces and the image side surfaces of the first lens L1, the second lens L2, the third lens L3, the fourth lens L4, the fifth lens L5, the sixth lens L6, the seventh lens L7, and the eighth lens L8 are all aspherical.

The first lens L1, the second lens L2, the third lens L3, the fourth lens L4, the fifth lens L5, the sixth lens L6, the seventh lens L7, and the eighth lens L8 are all made of plastic.

In addition, various parameters of the optical system 100 are given in Table 3. Definitions of the various parameters can be obtained from the first embodiment, and will not be repeated herein.

TABLE 3

| Second Embodiment $f = 4.39$ mm, FNO = 2.32, FOV = 82.7° | | | | | | | | |
|---|---|---|---|---|---|---|---|---|
| Surface Number | Surface Name | Surface Type | Y radius (mm) | Thickness (mm) | Material | Refractive index | Abbe number | Focal Length (mm) |
| | Object plane | Spherical | Infinite | 400.000 | | | | |
| | Stop | Spherical | Infinite | −0.246 | | | | |
| 1 | First lens | Aspherical | 1.998 | 0.541 | Plastic | 1.54 | 56.1 | 5.13 |
| 2 | | Aspherical | 6.299 | 0.176 | | | | |
| 3 | Second lens | Aspherical | −14.953 | 0.267 | Plastic | 1.53 | 55.8 | 56.28 |
| 4 | | Aspherical | −10.063 | 0.067 | | | | |
| 5 | Third lens | Aspherical | 5.931 | 0.260 | Plastic | 1.53 | 55.8 | −153.24 |
| 6 | | Aspherical | 5.447 | 0.421 | | | | |
| 7 | Fourth lens | Aspherical | 13.784 | 0.270 | Plastic | 1.67 | 20.4 | 89.89 |
| 8 | | Aspherical | 17.633 | 0.059 | | | | |
| 9 | Fifth lens | Aspherical | −7.585 | 0.270 | Plastic | 1.64 | 23.8 | −10.70 |

TABLE 3-continued

Second Embodiment
f = 4.39 mm, FNO = 2.32, FOV = 82.7°

| Surface Number | Surface Name | Surface Type | Y radius (mm) | Thickness (mm) | Material | Refractive index | Abbe number | Focal Length (mm) |
|---|---|---|---|---|---|---|---|---|
| 10 |  | Aspherical | 75.857 | 0.150 |  |  |  |  |
| 11 | Sixth lens | Aspherical | 78.671 | 0.900 | Plastic | 1.53 | 55.8 | 3.40 |
| 12 |  | Aspherical | −1.865 | 0.138 |  |  |  |  |
| 13 | Seventh lens | Aspherical | −5.594 | 0.559 | Plastic | 1.67 | 20.4 | −10.09 |
| 14 |  | Aspherical | −32.715 | 0.736 |  |  |  |  |
| 15 | Eighth lens | Aspherical | 11.561 | 0.390 | Plastic | 1.53 | 55.8 | −3.78 |
| 16 |  | Aspherical | 1.708 | 0.333 |  |  |  |  |
| 17 | Infrared | Spherical | Infinite | 0.210 | Glass | 1.52 | 64.2 |  |
| 18 | Filter | Spherical | Infinite | 0.100 |  |  |  |  |
| 19 | Image plane | Spherical | Infinite | 0.000 |  |  |  |  |

Further, the aspherical coefficients of the image side surfaces or object side surfaces of the lenses of the optical system 100 are given in Table 4. Definitions of the various parameters can be obtained from the first embodiment, and will not be repeated herein.

TABLE 4

Second Embodiment

| Surface number | 1 | 2 | 3 | 4 | 5 | 6 |
|---|---|---|---|---|---|---|
| K | 3.470E−01 | 3.151E+01 | 8.129E+01 | 4.539E−01 | −3.762E−02 | 7.221E+00 |
| A4 | −8.611E−03 | −1.532E−02 | −1.104E−02 | 2.518E−03 | 4.111E−04 | −2.794E−02 |
| A6 | 6.947E−02 | −3.272E−02 | 1.052E−02 | −3.106E−02 | −7.240E−03 | 2.086E−02 |
| A8 | −4.653E−01 | 1.676E−01 | −5.642E−02 | 1.911E−01 | 6.463E−02 | −7.447E−02 |
| A10 | 1.838E+00 | −6.854E−01 | 1.895E−01 | −6.993E−01 | −2.540E−01 | 1.787E−01 |
| A12 | −4.508E+00 | 1.632E+00 | −3.579E−01 | 1.554E+00 | 5.363E−01 | −3.094E−01 |
| A14 | 6.928E+00 | −2.351E+00 | 4.255E−01 | −2.099E+00 | −6.620E−01 | 3.352E−01 |
| A16 | −6.480E+00 | 1.978E+00 | −3.302E−01 | 1.681E+00 | 4.790E−01 | −2.123E−01 |
| A18 | 3.370E+00 | −8.874E−01 | 1.571E−01 | −7.322E−01 | −1.881E−01 | 6.920E−02 |
| A20 | −7.466E−01 | 1.634E−01 | −3.111E−02 | 1.335E−01 | 3.095E−02 | −7.883E−03 |

| Surface number | 7 | 8 | 9 | 10 | 11 | 12 |
|---|---|---|---|---|---|---|
| K | 1.624E+01 | −9.900E+01 | 3.008E+01 | 9.900E+01 | 1.152E+00 | −6.402E+00 |
| A4 | −1.440E−01 | −1.657E−01 | −3.147E−02 | −2.919E−02 | −1.000E−01 | −5.733E−02 |
| A6 | 2.897E−01 | 3.520E−01 | 1.904E−02 | 3.135E−02 | 2.260E−01 | 9.192E−02 |
| A8 | −1.180E+00 | −1.111E+00 | −5.938E−02 | −2.025E−02 | −3.334E−01 | −1.170E−01 |
| A10 | 2.791E+00 | 2.145E+00 | 1.803E−01 | 6.591E−03 | 3.083E−01 | 6.928E−02 |
| A12 | −4.353E+00 | −2.682E+00 | −2.729E−01 | −1.191E−03 | −1.803E−01 | −1.735E−02 |
| A14 | 4.401E+00 | 2.182E+00 | 2.461E−01 | 2.798E−04 | 6.751E−02 | 5.841E−06 |
| A16 | −2.778E+00 | −1.111E+00 | −1.351E−01 | −1.640E−04 | −1.577E−02 | 9.555E−04 |
| A18 | 9.908E−01 | 3.200E−01 | 4.114E−02 | 4.821E−05 | 2.102E−03 | −1.944E−04 |
| A20 | −1.507E−01 | −3.941E−02 | −5.326E−03 | −5.691E−06 | −1.226E−04 | 1.265E−05 |

| Surface number | 13 | 14 | 15 | 16 |
|---|---|---|---|---|
| K | 2.139E+00 | −5.986E+01 | −8.301E+00 | −4.283E+00 |
| A4 | 1.273E−01 | 1.044E−01 | −7.374E−02 | −5.832E−02 |
| A6 | −1.013E−01 | −1.084E−01 | −9.620E−03 | 1.499E−02 |
| A8 | 1.437E−02 | 4.865E−02 | 1.110E−02 | −2.934E−03 |
| A10 | 1.004E−02 | −1.389E−02 | −2.725E−03 | 5.645E−04 |
| A12 | −3.974E−03 | 2.794E−03 | 3.388E−04 | −9.255E−05 |
| A14 | 8.295E−05 | −4.010E−04 | −2.343E−05 | 1.029E−05 |
| A16 | 1.931E−04 | 3.879E−05 | 8.488E−07 | −6.927E−07 |
| A18 | −3.659E−05 | −2.217E−06 | −1.180E−08 | 2.536E−08 |
| A20 | 2.097E−06 | 5.544E−08 | −4.119E−11 | −3.862E−10 |

In addition, based on the parameter information provided above, the following relationships can be deduced:

(MIN6*MAX8/MAX6*MIN8)=1.284; (SAG61+SAG62)/(SAG71+SAG72)=0.498; Y71−Y62=0.101; 100*ΣCT/FOV=4.183; (CT7+CT8)/CT6=1.054; (ET2+ET3)/(CT2+CT3)=0.928; TTL/f=1.333; TTL/ImgH=1.463; f67/f=1.156; and f4/f=20.477.

Third Embodiment

Figure 5:
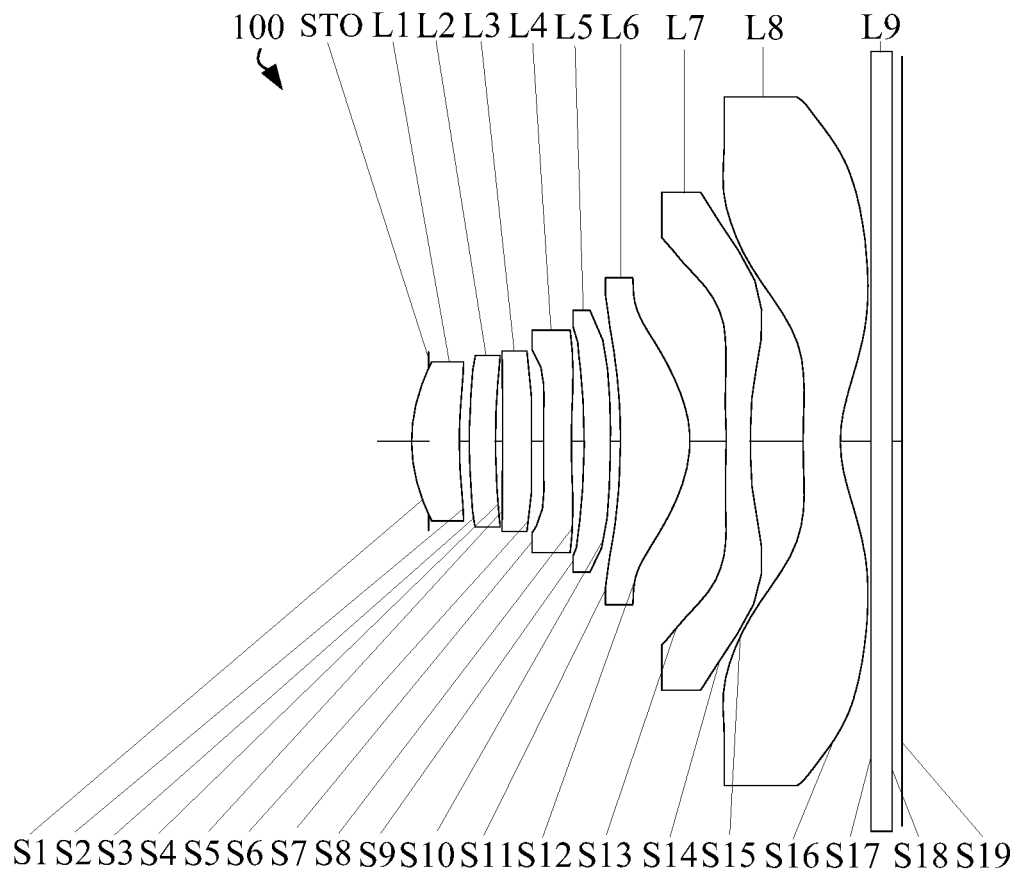
FIG. 5 is a schematic view of an optical system according to a third embodiment of the present disclosure.
Figure 6:
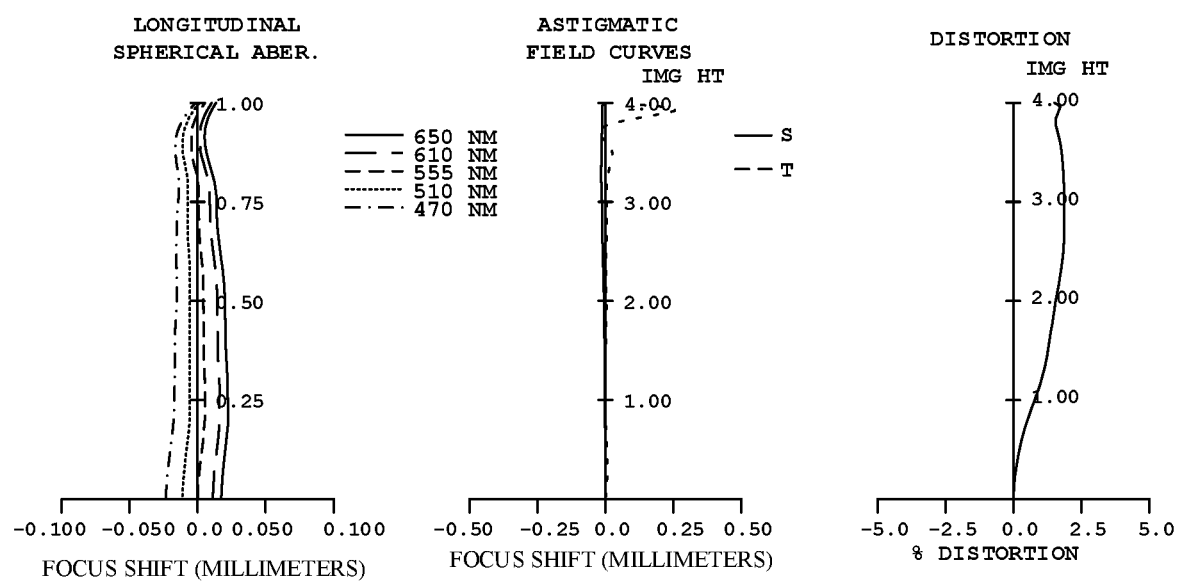
FIG. 6 is a graph showing spherical aberration, astigmatism, and distortion of the optical system according to the third embodiment of the present disclosure.

Referring to FIGS. 5 and 6, FIG. 5 is a schematic view of an optical system 100 according to the third embodiment. The optical system 100 includes, sequentially from an object side to an image side, a stop STO, a first lens L1 having a positive refractive power, a second lens L2 having a positive refractive power, a third lens L3 having a negative refractive power, a fourth lens L4 having a positive refractive power, a fifth lens L5 having a negative refractive power, a sixth lens L6 having a positive refractive power, a seventh lens L7 having a negative refractive power, and an eighth lens L8 having a negative refractive power. FIG. 6 is a graph showing spherical aberration, astigmatism, and distortion of the optical system 100 in the third embodiment sequentially from left to right.

An object side surface S1 of the first lens L1 is convex at a paraxial area and convex at a circumference thereof.

An image side surface S2 of the first lens L1 is concave at a paraxial area and concave at a circumference thereof.

An object side surface S3 of the second lens L2 is convex at a paraxial area and convex at a circumference thereof.

An image side surface S4 of the second lens L2 is concave at a paraxial area and concave at a circumference thereof.

An object side surface S5 of the third lens L3 is concave at a paraxial area and concave at a circumference thereof.

An image side surface S6 of the third lens L3 is concave at a paraxial area and convex at a circumference thereof.

An object side surface S7 of the fourth lens L4 is convex at a paraxial area and concave at a circumference thereof.

An image side surface S8 of the fourth lens L4 is concave at a paraxial area and convex at a circumference thereof.

An object side surface S9 of the fifth lens L5 is concave at a paraxial area and concave at a circumference thereof.

An image side surface S10 of the fifth lens L5 is convex at a paraxial area and convex at a circumference thereof.

An object side surface S11 of the sixth lens L6 is concave at a paraxial area and concave at a circumference thereof.

An image side surface S12 of the sixth lens L6 is convex at a paraxial area and convex at a circumference thereof.

An object side surface S13 of the seventh lens L7 is concave at a paraxial area and concave at a circumference thereof.

An image side surface S14 of the seventh lens L7 is concave at a paraxial area and convex at a circumference thereof.

An object side surface S15 of the eighth lens L8 is convex at a paraxial area and concave at a circumference thereof.

An image side surface S16 of the eighth lens L8 is concave at a paraxial area and convex at a circumference thereof.

The object side surfaces and the image side surfaces of the first lens L1, the second lens L2, the third lens L3, the fourth lens L4, the fifth lens L5, the sixth lens L6, the seventh lens L7, and the eighth lens L8 are all aspherical.

The first lens L1, the second lens L2, the third lens L3, the fourth lens L4, the fifth lens L5, the sixth lens L6, the seventh lens L7, and the eighth lens L8 are all made of plastic.

In addition, various parameters of the optical system 100 are given in Table 5. Definitions of the various parameters can be obtained from the first embodiment, and will not be repeated herein.

TABLE 5

Third Embodiment
f = 3.59 mm, FNO = 2.28, FOV = 94.4°

| Surface Number | Surface Name | Surface Type | Y radius (mm) | Thickness (mm) | Material | Refractive index | Abbe number | Focal Length (mm) |
|---|---|---|---|---|---|---|---|---|
|  | Object plane | Spherical | Infinite | 400.000 |  |  |  |  |
|  | Stop | Spherical | Infinite | −0.169 |  |  |  |  |
| 1 | First lens | Aspherical | 1.824 | 0.476 | Plastic | 1.54 | 56.1 | 4.96 |
| 2 |  | Aspherical | 5.067 | 0.100 |  |  |  |  |
| 3 | Second lens | Aspherical | 6.822 | 0.260 | Plastic | 1.53 | 55.8 | 67.55 |
| 4 |  | Aspherical | 8.291 | 0.070 |  |  |  |  |
| 5 | Third lens | Aspherical | −317.716 | 0.292 | Plastic | 1.53 | 55.8 | −202.81 |
| 6 |  | Aspherical | 165.657 | 0.116 |  |  |  |  |
| 7 | Fourth lens | Aspherical | 8.558 | 0.280 | Plastic | 1.67 | 20.4 | 84.06 |
| 8 |  | Aspherical | 9.939 | 0.128 |  |  |  |  |
| 9 | Fifth lens | Aspherical | −7.647 | 0.260 | Plastic | 1.64 | 23.8 | −25.95 |
| 10 |  | Aspherical | −14.353 | 0.100 |  |  |  |  |
| 11 | Sixth lens | Aspherical | −7.907 | 0.693 | Plastic | 1.53 | 55.8 | 2.91 |
| 12 |  | Aspherical | −1.343 | 0.361 |  |  |  |  |
| 13 | Seventh lens | Aspherical | −5.917 | 0.242 | Plastic | 1.67 | 20.4 | −6.14 |
| 14 |  | Aspherical | 14.260 | 0.526 |  |  |  |  |
| 15 | Eighth lens | Aspherical | 7.372 | 0.370 | Plastic | 1.53 | 55.8 | −3.55 |
| 16 |  | Aspherical | 1.488 | 0.307 |  |  |  |  |
| 17 | Infrared | Spherical | Infinite | 0.210 | Glass | 1.52 | 64.2 |  |
| 18 | Filter | Spherical | Infinite | 0.100 |  |  |  |  |
| 19 | Image plane | Spherical | Infinite | 0.000 |  |  |  |  |

Further, the aspherical coefficients of the image side surfaces or object side surfaces of the lenses of the optical system 100 are given in Table 6. Definitions of the various parameters can be obtained from the first embodiment, and will not be repeated herein.

TABLE 6

Third Embodiment

| Surface number | 1 | 2 | 3 | 4 | 5 | 6 |
|---|---|---|---|---|---|---|
| K | −8.158E−02 | 2.031E+01 | −6.526E+01 | 4.896E−01 | 9.900E+01 | −9.900E+01 |
| A4 | −1.974E−02 | −5.553E−02 | −6.517E−03 | 1.077E−02 | 7.969E−03 | −7.706E−02 |
| A6 | 1.943E−01 | −1.853E−01 | −1.253E−01 | −2.346E−01 | −9.588E−02 | 1.980E−01 |
| A8 | −1.745E+00 | 1.756E+00 | 1.284E+00 | 1.874E+00 | 3.688E−01 | −1.229E+00 |

TABLE 6-continued

Third Embodiment

| | | | | | | |
|---|---|---|---|---|---|---|
| A10 | 8.896E+00 | −1.167E+01 | −8.015E+00 | −8.183E+00 | 1.631E−01 | 5.106E+00 |
| A12 | −2.812E+01 | 4.632E+01 | 3.060E+01 | 2.102E+01 | −7.055E+00 | −1.340E+01 |
| A14 | 5.528E+01 | −1.104E+02 | −6.997E+01 | −3.101E+01 | 2.599E+01 | 2.127E+01 |
| A16 | −6.603E+01 | 1.538E+02 | 9.292E+01 | 2.411E+01 | −4.329E+01 | −1.972E+01 |
| A18 | 4.396E+01 | −1.150E+02 | −6.570E+01 | −7.656E+00 | 3.499E+01 | 9.845E+00 |
| A20 | −1.255E+01 | 3.565E+01 | 1.913E+01 | 1.610E−02 | −1.114E+01 | −2.039E+00 |

| Surface number | 7 | 8 | 9 | 10 | 11 | 12 |
|---|---|---|---|---|---|---|
| K | −5.680E+01 | 2.703E+01 | 3.591E+01 | 9.858E+01 | 1.235E+01 | −5.293E+00 |
| A4 | −1.167E−01 | −3.383E−02 | 2.090E−02 | −2.275E−02 | −4.406E−02 | −1.233E−01 |
| A6 | −6.771E−02 | −2.149E−02 | 3.568E−02 | 6.607E−02 | 1.278E−01 | 1.705E−01 |
| A8 | 1.863E−01 | −3.029E−01 | −3.038E−01 | −1.290E−01 | −1.201E−01 | −2.002E−01 |
| A10 | −9.498E−01 | 1.210E+00 | 6.381E−01 | 8.636E−02 | −2.435E−02 | 1.681E−01 |
| A12 | 3.830E+00 | −2.015E+00 | −4.946E−01 | 7.935E−03 | 1.422E−01 | −1.009E−01 |
| A14 | −9.157E+00 | 1.814E+00 | 1.729E−02 | −4.649E−02 | −1.288E−01 | 4.476E−02 |
| A16 | 1.176E+01 | −9.098E−01 | 2.042E−01 | 2.899E−02 | 5.802E−02 | −1.311E−02 |
| A18 | −7.670E+00 | 2.317E−01 | −1.189E−01 | −7.705E−03 | −1.348E−02 | 2.136E−03 |
| A20 | 2.009E+00 | −2.163E−02 | 2.178E−02 | 7.221E−04 | 1.278E−03 | −1.441E−04 |

| Surface number | 13 | 14 | 15 | 16 |
|---|---|---|---|---|
| K | −8.426E−01 | 2.622E+01 | −7.131E+00 | −4.168E+00 |
| A4 | 2.536E−01 | 2.115E−01 | −1.072E−01 | −7.857E−02 |
| A6 | −2.900E−01 | −2.644E−01 | −1.282E−02 | 2.418E−02 |
| A8 | 1.784E−01 | 1.567E−01 | 1.782E−02 | −6.050E−03 |
| A10 | −8.304E−02 | −5.928E−02 | −3.889E−03 | 1.391E−03 |
| A12 | 3.220E−02 | 1.486E−02 | 1.830E−04 | −2.479E−04 |
| A14 | −1.002E−02 | −2.455E−03 | 5.057E−05 | 2.934E−05 |
| A16 | 2.134E−03 | 2.576E−04 | −8.879E−06 | −2.123E−06 |
| A18 | −2.575E−04 | −1.555E−05 | 5.644E−07 | 8.457E−08 |
| A20 | 1.293E−05 | 4.099E−07 | −1.324E−08 | −1.418E−09 |

In addition, based on the parameter information provided above, the following relationships can be deduced:

(MIN6*MAX8/MAX6*MIN8)=1.437; (SAG61+ SAG62)/(SAG71+SAG72)=0.631; Y71− Y62=0.431; 100*ΣCT/FOV=3.042; (CT7+CT8)/ CT6=0.883; (ET2+ET3)/(CT2+CT3)=0.924; TTL/f=1.362; TTL/ImgH=1.223; f67/f=1.401; and f4/f=23.416.

Fourth Embodiment

Figure 7:
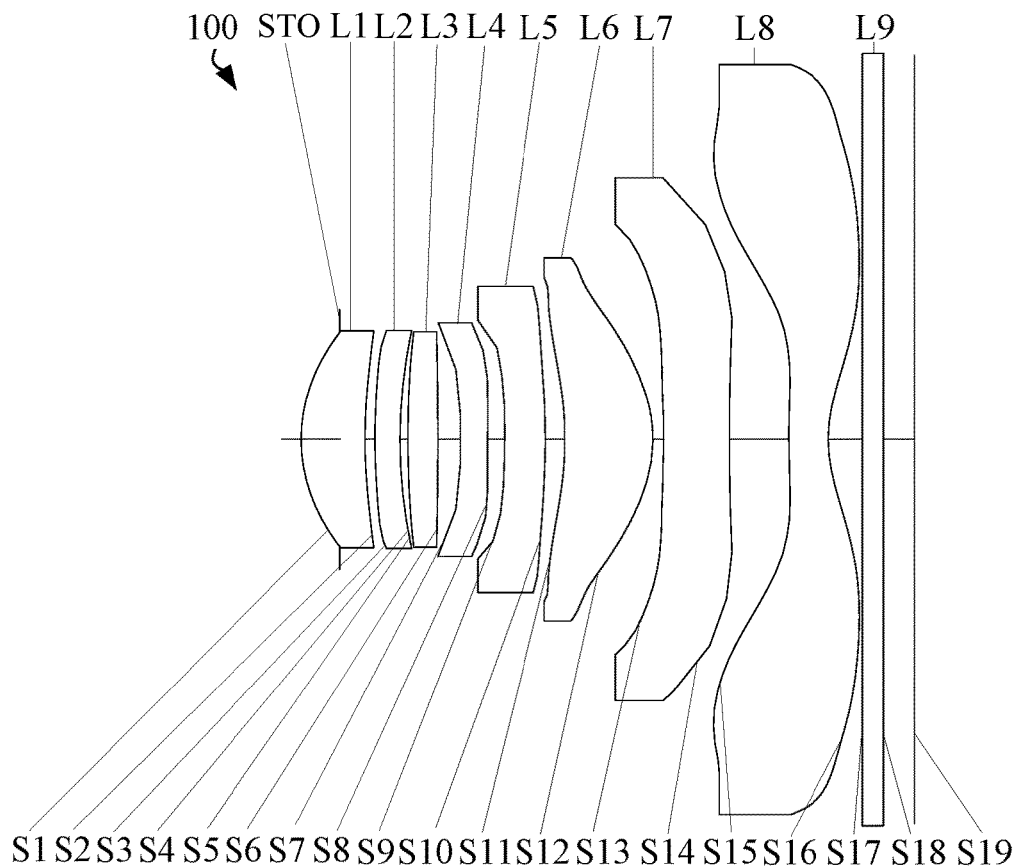
FIG. 7 is a schematic view of an optical system according to a fourth embodiment of the present disclosure.
Figure 8:
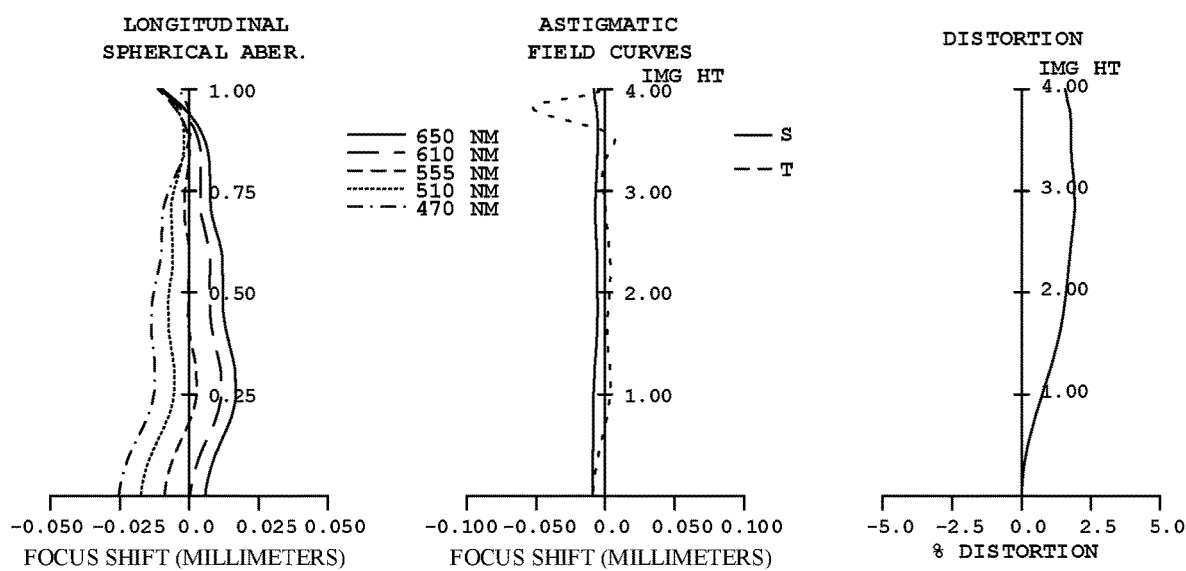
FIG. 8 is a graph showing spherical aberration, astigmatism, and distortion of the optical system according to the fourth embodiment of the present disclosure.

Referring to FIGS. 7 and 8, FIG. 7 is a schematic view of an optical system 100 according to the fourth embodiment. The optical system 100 includes, sequentially from an object side to an image side, a stop STO, a first lens L1 having a positive refractive power, a second lens L2 having a negative refractive power, a third lens L3 having a positive refractive power, a fourth lens L4 having a negative refractive power, a fifth lens L5 having a positive refractive power, a sixth lens L6 having a positive refractive power, a seventh lens L7 having a negative refractive power, and an eighth lens L8 having a negative refractive power. FIG. 8 is a graph showing spherical aberration, astigmatism, and distortion of the optical system 100 in the fourth embodiment sequentially from left to right.

An object side surface S1 of the first lens L1 is convex at a paraxial area and convex at a circumference thereof.

An image side surface S2 of the first lens L1 is concave at a paraxial area and concave at a circumference thereof.

An object side surface S3 of the second lens L2 is convex at a paraxial area and convex at a circumference thereof.

An image side surface S4 of the second lens L2 is concave at a paraxial area and concave at a circumference thereof.

An object side surface S5 of the third lens L3 is convex at a paraxial area and convex at a circumference thereof.

An image side surface S6 of the third lens L3 is concave at a paraxial area and concave at a circumference thereof.

An object side surface S7 of the fourth lens L4 is concave at a paraxial area and concave at a circumference thereof.

An image side surface S8 of the fourth lens L4 is concave at a paraxial area and convex at a circumference thereof.

An object side surface S9 of the fifth lens L5 is concave at a paraxial area and concave at a circumference thereof.

An image side surface S10 of the fifth lens L5 is convex at a paraxial area and convex at a circumference thereof.

An object side surface S11 of the sixth lens L6 is concave at a paraxial area and concave at a circumference thereof.

An image side surface S12 of the sixth lens L6 is convex at a paraxial area and convex at a circumference thereof.

An object side surface S13 of the seventh lens L7 is concave at a paraxial area and concave at a circumference thereof.

An image side surface S14 of the seventh lens L7 is convex at a paraxial area and convex at a circumference thereof.

An object side surface S15 of the eighth lens L8 is convex at a paraxial area and concave at a circumference thereof.

An image side surface S16 of the eighth lens L8 is concave at a paraxial area and convex at a circumference thereof.

The object side surfaces and the image side surfaces of the first lens L1, the second lens L2, the third lens L3, the fourth lens L4, the fifth lens L5, the sixth lens L6, the seventh lens L7, and the eighth lens L8 are all aspherical.

The first lens L1, the second lens L2, the third lens L3, the fourth lens L4, the fifth lens L5, the sixth lens L6, the seventh lens L7, and the eighth lens L8 are all made of plastic.

In addition, various parameters of the optical system 100 are given in Table 7. Definitions of the various parameters can be obtained from the first embodiment, and will not be repeated herein.

TABLE 7

Fourth Embodiment
f = 4.66 mm, FNO = 2.02, FOV = 79.2°

| Surface Number | Surface Name | Surface Type | Y radius (mm) | Thickness (mm) | Material | Refractive index | Abbe number | Focal Length (mm) |
|---|---|---|---|---|---|---|---|---|
| | Object plane | Spherical | Infinite | 400.000 | | | | |
| | Stop | Spherical | Infinite | −0.385 | | | | |
| 1 | First lens | Aspherical | 1.932 | 0.638 | Plastic | 1.54 | 56.1 | 4.86 |
| 2 | | Aspherical | 6.278 | 0.100 | | | | |
| 3 | Second lens | Aspherical | 7.956 | 0.250 | Plastic | 1.53 | 55.8 | −49.31 |
| 4 | | Aspherical | 6.050 | 0.079 | | | | |
| 5 | Third lens | Aspherical | 12.099 | 0.300 | Plastic | 1.53 | 55.8 | 26.76 |
| 6 | | Aspherical | 76.146 | 0.228 | | | | |
| 7 | Fourth lens | Aspherical | −46.875 | 0.270 | Plastic | 1.67 | 20.4 | −15.53 |
| 8 | | Aspherical | 13.597 | 0.172 | | | | |
| 9 | Fifth lens | Aspherical | −13.496 | 0.413 | Plastic | 1.64 | 23.8 | 47.42 |
| 10 | | Aspherical | −9.455 | 0.195 | | | | |
| 11 | Sixth lens | Aspherical | −4.571 | 0.884 | Plastic | 1.53 | 55.8 | 4.13 |
| 12 | | Aspherical | −1.592 | 0.107 | | | | |
| 13 | Seventh lens | Aspherical | −7.363 | 0.656 | Plastic | 1.67 | 20.4 | −12.56 |
| 14 | | Aspherical | −56.432 | 0.595 | | | | |
| 15 | Eighth lens | Aspherical | 8.408 | 0.400 | Plastic | 1.53 | 55.8 | −3.84 |
| 16 | | Aspherical | 1.629 | 0.342 | | | | |
| 17 | Infrared Filter | Spherical | Infinite | 0.210 | Glass | 1.52 | 64.2 | |
| 18 | | Spherical | Infinite | 0.311 | | | | |
| 19 | Image plane | Spherical | Infinite | 0.000 | | | | |

Further, the aspherical coefficients of the image side surfaces or object side surfaces of the lenses of the optical system 100 are given in Table 8. Definitions of the various parameters can be obtained from the first embodiment, and will not be repeated herein.

In addition, based on the parameter information provided above, the following relationships can be deduced:

$(MIN6*MAX8/MAX6*MIN8)=1.414$; $(SAG61+SAG62)/(SAG71+SAG72)=0.899$; $Y71-Y62=0.363$; $100*\Sigma CT/FOV=4.813$; $(CT7+CT8)/$

TABLE 8

Fourth Embodiment

| Surface Number | 1 | 2 | 3 | 4 | 5 | 6 |
|---|---|---|---|---|---|---|
| K | 1.706E−01 | 2.875E+01 | 9.900E+01 | 9.900E+01 | 8.276E+01 | 5.262E+03 |
| A4 | −5.635E−03 | −3.344E−02 | −1.519E−02 | −3.285E−02 | −1.323E−01 | −1.097E−01 |
| A6 | 3.191E−02 | −7.171E−03 | 1.984E−02 | −7.279E−04 | 1.866E−01 | 2.353E−01 |
| A8 | −2.111E−01 | −1.334E−01 | −1.314E−01 | −1.148E−02 | −1.104E+00 | −5.971E−01 |
| A10 | 6.592E−01 | 5.052E−01 | 5.204E−01 | 1.623E−02 | 3.384E+00 | 9.542E−01 |
| A12 | −1.142E+00 | −1.297E+00 | −9.800E−01 | 2.371E−02 | −6.892E+00 | −1.005E+00 |
| A14 | 8.924E−01 | 2.150E+00 | 9.806E−01 | −5.992E−02 | 9.080E+00 | 6.979E−01 |
| A16 | 4.139E−02 | −2.361E+00 | −3.594E−01 | 5.013E−02 | −7.450E+00 | −3.066E−01 |
| A18 | −4.987E−01 | 1.649E+00 | 0.000E+00 | 0.000E+00 | 3.429E+00 | 7.667E−02 |
| A20 | 2.181E−01 | −5.426E−01 | 0.000E+00 | 0.000E+00 | −6.612E−01 | −8.192E−03 |

| Surface Number | 7 | 8 | 9 | 10 | 11 | 12 |
|---|---|---|---|---|---|---|
| K | 5.262E+03 | 5.262E+03 | 2.487E+00 | −4.018E+00 | −2.257E+00 | 1.356E+01 |
| A4 | −1.097E−01 | −1.097E−01 | −1.216E−01 | −8.648E−02 | 2.468E−01 | 2.033E−01 |
| A6 | 2.353E−01 | 2.353E−01 | 3.501E−01 | 1.704E−01 | −2.449E−01 | −2.225E−01 |
| A8 | −5.971E−01 | −5.971E−01 | −5.023E−01 | −3.373E−01 | 1.140E−01 | 1.113E−01 |
| A10 | 9.542E−01 | 9.542E−01 | 4.376E−01 | 3.919E−01 | −3.182E−02 | −3.401E−02 |
| A12 | −1.005E+00 | −1.005E+00 | −2.251E−01 | −2.860E−01 | 5.734E−03 | 6.229E−03 |
| A14 | 6.979E−01 | 6.979E−01 | 6.406E−02 | 1.330E−01 | −1.134E−03 | −5.953E−04 |
| A16 | −3.066E−01 | −3.066E−01 | −7.433E−03 | −3.722E−02 | 2.944E−04 | 1.228E−05 |
| A18 | 7.667E−02 | 7.667E−02 | −5.080E−04 | 5.634E−03 | −4.652E−05 | 2.458E−06 |
| A20 | −8.192E−03 | −8.192E−03 | 1.449E−04 | −3.518E−04 | 2.774E−06 | −1.518E−07 |

| Surface Number | 13 | 14 | 15 | 16 |
|---|---|---|---|---|
| K | −1.410E+01 | −4.440E+00 | −4.440E+00 | −4.440E+00 |
| A4 | −6.214E−02 | −6.520E−02 | −6.520E−02 | −6.520E−02 |
| A6 | −4.788E−02 | 3.271E−03 | 3.271E−03 | 3.271E−03 |
| A8 | 3.230E−02 | 3.413E−03 | 3.413E−03 | 3.413E−03 |
| A10 | −8.132E−03 | −9.447E−04 | −9.447E−04 | −9.447E−04 |
| A12 | 1.089E−03 | 1.194E−04 | 1.194E−04 | 1.194E−04 |
| A14 | −8.028E−05 | −8.705E−06 | −8.705E−06 | −8.705E−06 |
| A16 | 2.852E−06 | 3.858E−07 | 3.858E−07 | 3.858E−07 |
| A18 | −1.706E−08 | −1.018E−08 | −1.018E−08 | −1.018E−08 |
| A20 | −1.110E−09 | 1.327E−10 | 1.327E−10 | 1.327E−10 |

$CT6=1.195$; $(ET2+ET3)/(CT2+CT3)=0.871$; $TTL/f=1.320$; $TTL/ImgH=1.538$; $f67/f=1.355$; and $f4/f=-3.332$.

Fifth Embodiment

Figure 9:
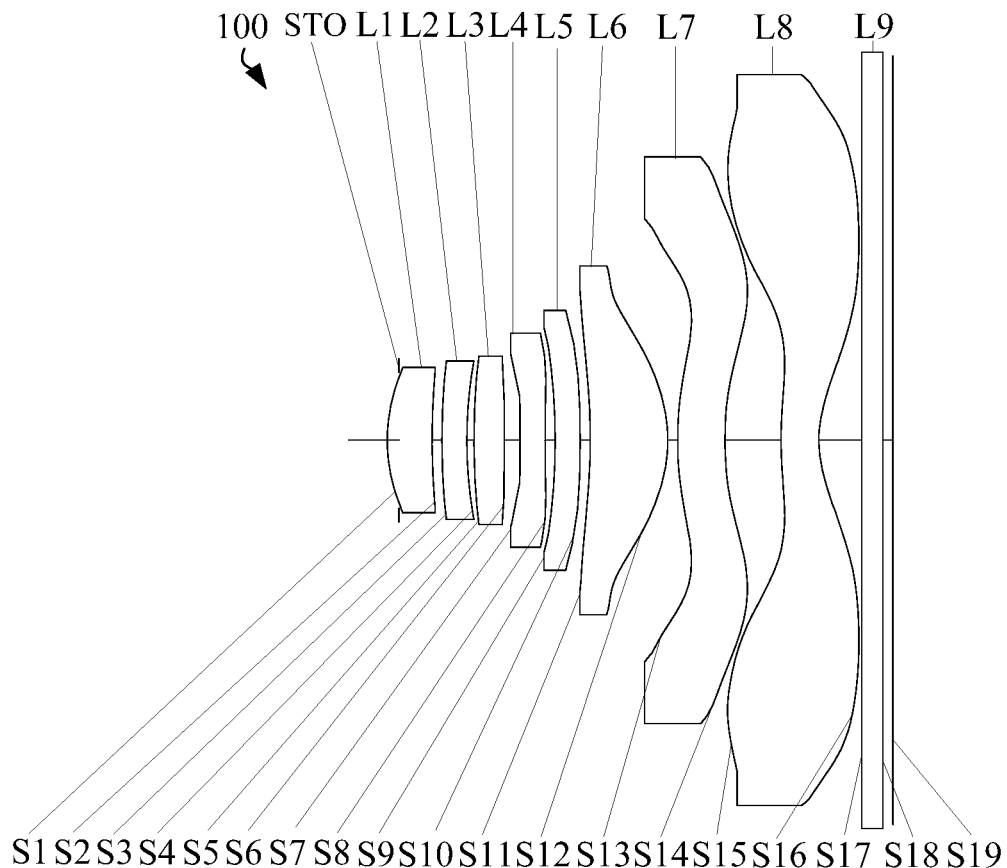
FIG. 9 is a schematic view of an optical system according to a fifth embodiment of the present disclosure.
Figure 10:
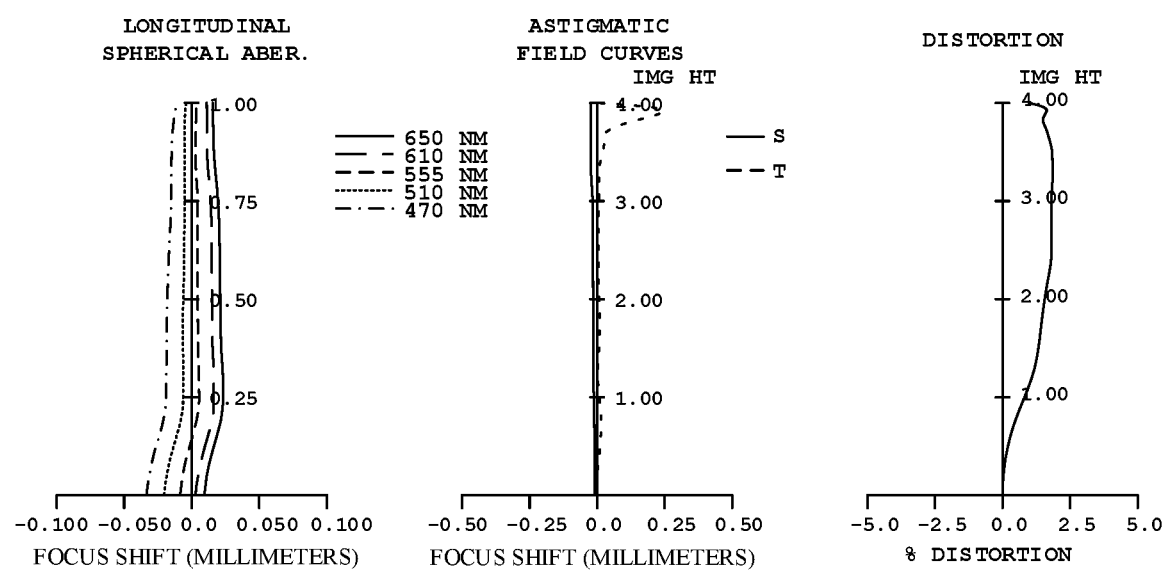
FIG. 10 is a graph showing spherical aberration, astigmatism, and distortion of the optical system according to the fifth embodiment of the present disclosure.

Referring to FIGS. 9 and 10, FIG. 9 is a schematic view of an optical system 100 according to the fifth embodiment. The optical system 100 includes, sequentially from an object side to an image side, a stop STO, a first lens L1 having a positive refractive power, a second lens L2 having a negative refractive power, a third lens L3 having a positive refractive power, a fourth lens L4 having a negative refractive power, a fifth lens L5 having a negative refractive power, a sixth lens L6 having a positive refractive power, a seventh lens L7 having a positive refractive power, and an eighth lens L8 having a negative refractive power. FIG. 10 is a graph showing spherical aberration, astigmatism, and distortion of the optical system 100 in the fifth embodiment sequentially from left to right.

An object side surface S1 of the first lens L1 is convex at a paraxial area and convex at a circumference thereof.

An image side surface S2 of the first lens L1 is concave at a paraxial area and concave at a circumference thereof.

An object side surface S3 of the second lens L2 is convex at a paraxial area and convex at a circumference thereof.

An image side surface S4 of the second lens L2 is concave at a paraxial area and concave at a circumference thereof.

An object side surface S5 of the third lens L3 is convex at a paraxial area and convex at a circumference thereof.

An image side surface S6 of the third lens L3 is concave at a paraxial area and convex at a circumference thereof.

An object side surface S7 of the fourth lens L4 is convex at a paraxial area and concave at a circumference thereof.

An image side surface S8 of the fourth lens L4 is concave at a paraxial area and convex at a circumference thereof.

An object side surface S9 of the fifth lens L5 is concave at a paraxial area and concave at a circumference thereof.

An image side surface S10 of the fifth lens L5 is convex at a paraxial area and convex at a circumference thereof.

An object side surface S11 of the sixth lens L6 is concave at a paraxial area and concave at a circumference thereof.

An image side surface S12 of the sixth lens L6 is convex at a paraxial area and convex at a circumference thereof.

An object side surface S13 of the seventh lens L7 is convex at a paraxial area and concave at a circumference thereof.

An image side surface S14 of the seventh lens L7 is concave at a paraxial area and convex at a circumference thereof.

An object side surface S15 of the eighth lens L8 is convex at a paraxial area and convex at a circumference thereof.

An image side surface S16 of the eighth lens L8 is concave at a paraxial area and convex at a circumference thereof.

The object side surfaces and the image side surfaces of the first lens L1, the second lens L2, the third lens L3, the fourth lens L4, the fifth lens L5, the sixth lens L6, the seventh lens L7, and the eighth lens L8 are all aspherical.

The first lens L1, the second lens L2, the third lens L3, the fourth lens L4, the fifth lens L5, the sixth lens L6, the seventh lens L7, and the eighth lens L8 are all made of plastic.

In addition, various parameters of the optical system 100 are given in Table 9. Definitions of the various parameters can be obtained from the first embodiment, and will not be repeated herein.

TABLE 9

Fifth Embodiment
f = 3.43 mm, FNO = 2.36, FOV = 97.5°

| Surface Number | Surface Name | Surface Type | Y radius (mm) | Thickness (mm) | Material | Refractive index | Abbe number | Focal Length (mm) |
|---|---|---|---|---|---|---|---|---|
| | Object plane | Spherical | Infinite | 400.000 | | | | |
| | Stop | Spherical | Infinite | −0.117 | | | | |
| 1 | First lens | Aspherical | 1.971 | 0.448 | Plastic | 1.54 | 56.1 | 5.09 |
| 2 | | Aspherical | 6.257 | 0.101 | | | | |
| 3 | Second lens | Aspherical | 7.721 | 0.250 | Plastic | 1.53 | 55.8 | −32.35 |
| 4 | | Aspherical | 5.284 | 0.071 | | | | |
| 5 | Third lens | Aspherical | 8.599 | 0.304 | Plastic | 1.53 | 55.8 | 17.11 |
| 6 | | Aspherical | 133.417 | 0.156 | | | | |
| 7 | Fourth lens | Aspherical | 20.678 | 0.252 | Plastic | 1.67 | 20.4 | −37.00 |
| 8 | | Aspherical | 11.276 | 0.100 | | | | |
| 9 | Fifth lens | Aspherical | −8.435 | 0.250 | Plastic | 1.64 | 23.8 | −27.95 |
| 10 | | Aspherical | −16.141 | 0.100 | | | | |
| 11 | Sixth lens | Aspherical | −8.867 | 0.778 | Plastic | 1.53 | 55.8 | 4.29 |
| 12 | | Aspherical | −1.883 | 0.100 | | | | |
| 13 | Seventh lens | Aspherical | 4.592 | 0.475 | Plastic | 1.67 | 20.4 | 47.53 |
| 14 | | Aspherical | 5.132 | 0.560 | | | | |
| 15 | Eighth lens | Aspherical | 4.751 | 0.380 | Plastic | 1.53 | 55.8 | −3.93 |
| 16 | | Aspherical | 1.420 | 0.431 | | | | |
| 17 | Inflated | Spherical | Infinite | 0.210 | Glass | 1.52 | 64.2 | |
| 18 | Filter | Spherical | Infinite | 0.100 | | | | |
| 19 | Image plane | Spherical | Infinite | 0.000 | | | | |

Further, the aspherical coefficients of the image side surfaces or object side surfaces of the lenses of the optical system 100 are given in Table 10. Definitions of the various parameters can be obtained from the first embodiment, and will not be repeated herein.

TABLE 10

Fifth Embodiment

| Surface Number | 1 | 2 | 3 | 4 | 5 | 6 |
|---|---|---|---|---|---|---|
| K | −4.812E−02 | 2.377E+01 | −3.682E+01 | 7.034E−01 | −3.779E+00 | 9.881E+01 |
| A4 | −3.628E−02 | −2.811E−02 | −1.160E−02 | 6.322E−04 | −4.550E−03 | −5.364E−02 |
| A6 | 6.678E−01 | −7.630E−02 | 1.654E−01 | −2.278E−03 | 4.819E−02 | 7.217E−02 |
| A8 | −7.717E+00 | 1.957E−01 | −1.525E+00 | −1.948E−03 | −1.847E−02 | 4.253E−02 |
| A10 | 5.151E+01 | −1.185E−01 | 7.591E+00 | 5.248E−02 | −1.633E+00 | −8.518E−01 |
| A12 | −2.115E+02 | −2.335E+00 | −2.252E+01 | −1.927E−01 | 9.090E+00 | 2.198E+00 |
| A14 | 5.397E+02 | 9.034E+00 | 4.013E+01 | 3.389E−01 | −2.336E+01 | −2.513E+00 |
| A16 | −8.343E+02 | −1.469E+01 | −4.130E+01 | −3.222E−01 | 3.259E+01 | 1.096E+00 |
| A18 | 7.148E+02 | 1.147E+01 | 2.218E+01 | 1.597E−01 | −2.390E+01 | 1.951E−01 |
| A20 | −2.604E+02 | −3.520E+00 | −4.619E+00 | −3.245E−02 | 7.234E+00 | −2.204E−01 |

| Surface Number | 7 | 8 | 9 | 10 | 11 | 12 |
|---|---|---|---|---|---|---|
| K | 2.710E+01 | −1.239E+01 | 3.771E+01 | 9.893E+01 | 5.621E+00 | −5.397E+00 |
| A4 | −1.502E−01 | −7.640E−02 | 2.992E−02 | −1.141E−02 | −4.586E−02 | −1.001E−01 |
| A6 | −4.244E−02 | −2.025E−02 | −1.273E−01 | −1.706E−02 | 1.602E−01 | 1.065E−01 |
| A8 | 6.629E−01 | 3.006E−01 | 2.420E−01 | −2.259E−02 | −2.466E−01 | −1.274E−01 |
| A10 | −2.516E+00 | −8.435E−01 | −2.960E−01 | 6.866E−02 | 2.366E−01 | 1.297E−01 |
| A12 | 4.759E+00 | 1.258E+00 | 3.114E−01 | −7.216E−02 | −1.520E−01 | −9.049E−02 |
| A14 | −5.271E+00 | −1.118E+00 | −2.514E−01 | 4.916E−02 | 6.628E−02 | 4.024E−02 |
| A16 | 3.411E+00 | 5.942E−01 | 1.294E−01 | −2.237E−02 | −1.879E−02 | −1.062E−02 |
| A18 | −1.195E+00 | −1.773E−01 | −3.773E−02 | 5.906E−03 | 3.117E−03 | 1.499E−03 |
| A20 | 1.831E−01 | 2.350E−02 | 4.784E−03 | −6.710E−04 | −2.306E−04 | −8.725E−05 |

| Surface Number | 13 | 14 | 15 | 16 |
|---|---|---|---|---|
| K | −5.066E+01 | −5.583E+01 | −7.213E+00 | −3.953E+00 |
| A4 | 9.371E−02 | 1.592E−01 | −6.136E−02 | −4.351E−02 |
| A6 | −8.141E−02 | −1.518E−01 | −1.866E−02 | 5.167E−03 |
| A8 | 1.325E−02 | 7.264E−02 | 1.309E−02 | 1.431E−04 |
| A10 | 1.214E−02 | −2.255E−02 | −2.625E−03 | −7.070E−06 |
| A12 | −9.079E−03 | 4.658E−03 | 2.276E−04 | −2.587E−05 |
| A14 | 2.827E−03 | −6.293E−04 | −3.710E−06 | 5.428E−06 |
| A16 | −4.644E−04 | 5.317E−05 | −8.155E−07 | −4.807E−07 |
| A18 | 3.939E−05 | −2.543E−06 | 5.855E−08 | 2.038E−08 |
| A20 | −1.367E−06 | 5.240E−08 | −1.239E−09 | −3.390E−10 |

In addition, based on the parameter information provided above, the following relationships can be deduced:

(MIN6*MAX8/MAX6*MIN8)=1.337; (SAG61+ SAG62)/(SAG71+SAG72)=1.243; Y71− Y62=0.512; 100*ΣCT/FOV=3.218; (CT7+CT8)/ CT6=1.098; (ET2+ET3)/(CT2+CT3)=0.938; TTL/f=1.478; TTL/ImgH=1.268; f67/f=1.108; and f4/f=−10.788.

Sixth Embodiment

Figure 11:
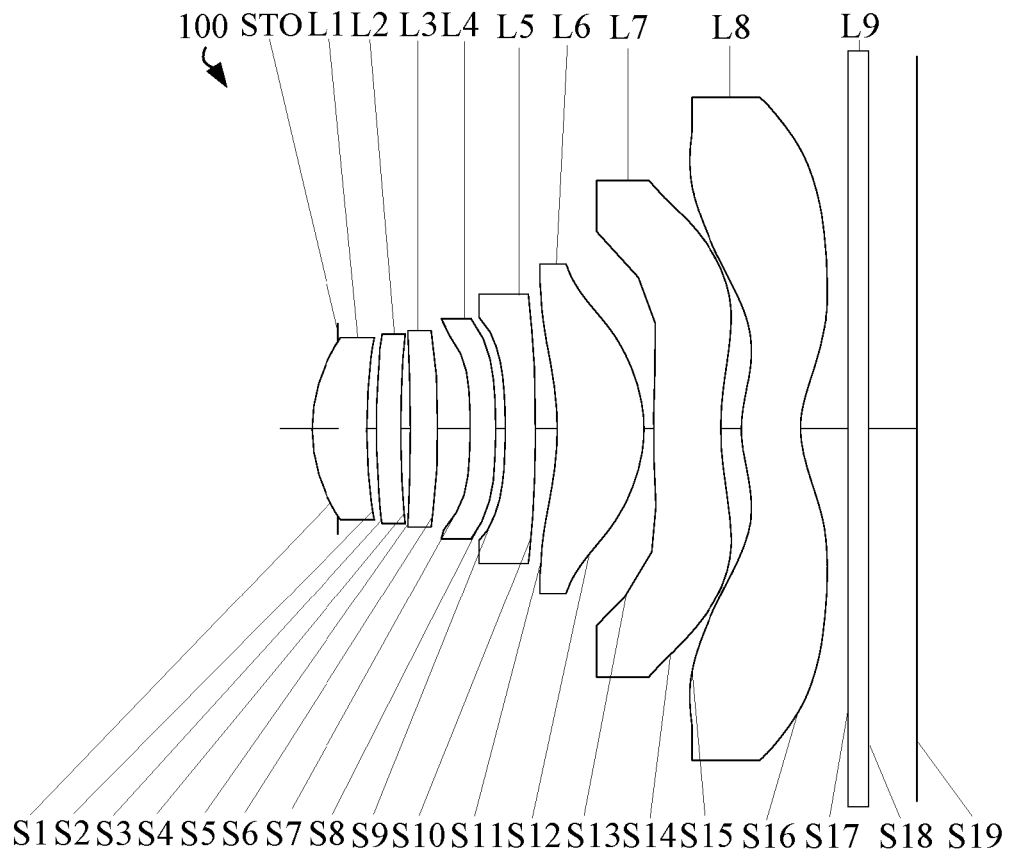
FIG. 11 is a schematic view of an optical system according to a sixth embodiment of the present disclosure.
Figure 12:
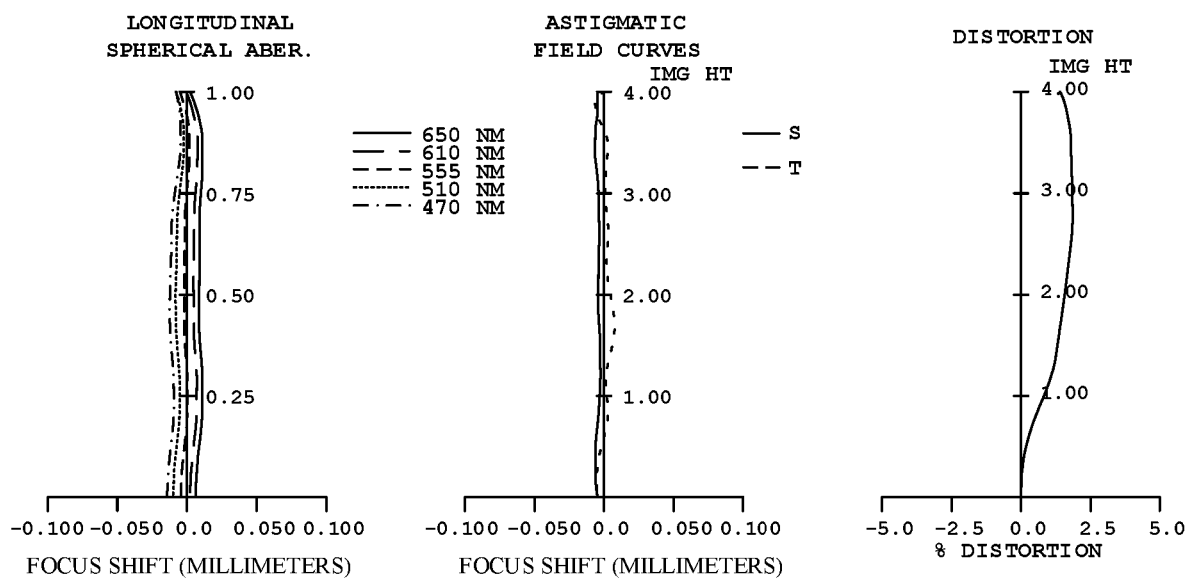
FIG. 12 is a graph showing spherical aberration, astigmatism, and distortion of the optical system according to the sixth embodiment of the present disclosure.

Referring to FIGS. 11 and 12, FIG. 11 is a schematic view of an optical system 100 according to the sixth embodiment. The optical system 100 includes, sequentially from an object side to an image side, a stop STO, a first lens L1 having a positive refractive power, a second lens L2 having a positive refractive power, a third lens L3 having a negative refractive power, a fourth lens L4 having a negative refractive power, a fifth lens L5 having a negative refractive power, a sixth lens L6 having a positive refractive power, a seventh lens L7 having a negative refractive power, and an eighth lens L8 having a positive refractive power. FIG. 12 is a graph showing spherical aberration, astigmatism, and distortion of the optical system 100 in the sixth embodiment sequentially from left to right.

An object side surface S1 of the first lens L1 is convex at a paraxial area and convex at a circumference thereof.

An image side surface S2 of the first lens L1 is concave at a paraxial area and concave at a circumference thereof.

An object side surface S3 of the second lens L2 is convex at a paraxial area and convex at a circumference thereof.

An image side surface S4 of the second lens L2 is concave at a paraxial area and concave at a circumference thereof.

An object side surface S5 of the third lens L3 is concave at a paraxial area and concave at a circumference thereof.

An image side surface S6 of the third lens L3 is convex at a paraxial area and concave at a circumference thereof.

An object side surface S7 of the fourth lens L4 is concave at a paraxial area and concave at a circumference thereof.

An image side surface S8 of the fourth lens L4 is convex at a paraxial area and convex at a circumference thereof.

An object side surface S9 of the fifth lens L5 is concave at a paraxial area and concave at a circumference thereof.

An image side surface S10 of the fifth lens L5 is convex at a paraxial area and convex at a circumference thereof.

An object side surface S11 of the sixth lens L6 is concave at a paraxial area and concave at a circumference thereof.

An image side surface S12 of the sixth lens L6 is convex at a paraxial area and convex at a circumference thereof.

An object side surface S13 of the seventh lens L7 is convex at a paraxial area and concave at a circumference thereof.

An image side surface S14 of the seventh lens L7 is concave at a paraxial area and convex at a circumference thereof.

An object side surface S15 of the eighth lens L8 is convex at a paraxial area and convex at a circumference thereof.

An image side surface S16 of the eighth lens L8 is concave at a paraxial area and convex at a circumference thereof.

The object side surfaces and the image side surfaces of the first lens L1, the second lens L2, the third lens L3, the fourth lens L4, the fifth lens L5, the sixth lens L6, the seventh lens L7, and the eighth lens L8 are all aspherical.

The first lens L1, the second lens L2, the third lens L3, the fourth lens L4, the fifth lens L5, the sixth lens L6, the seventh lens L7, and the eighth lens L8 are all made of plastic.

In addition, various parameters of the optical system 100 are given in Table 11. Definitions of the various parameters can be obtained from the first embodiment, and will not be repeated herein.

TABLE 11

Sixth Embodiment
f = 4.75 mm, FNO = 2.48, FOV = 78.4°

| Surface Number | Surface Name | Surface Type | Y radius (mm) | Thickness (mm) | Material | Refractive index | Abbe number | Focal Length (mm) |
|---|---|---|---|---|---|---|---|---|
|  | Object plane | Spherical | Infinite | 400.000 |  |  |  |  |
|  | Stop | Spherical | Infinite | −0.270 |  |  |  |  |
| 1 | First lens | Aspherical | 1.907 | 0.566 | Plastic | 1.54 | 56.1 |  |
| 2 |  | Aspherical | 5.815 | 0.100 |  |  |  |  |
| 3 | Second lens | Aspherical | 7.179 | 0.250 | Plastic | 1.53 | 55.8 | 33.66 |
| 4 |  | Aspherical | 11.768 | 0.100 |  |  |  |  |
| 5 | Third lens | Aspherical | −21.473 | 0.278 | Plastic | 1.53 | 55.8 | −88.66 |
| 6 |  | Aspherical | −39.306 | 0.338 |  |  |  |  |
| 7 | Fourth lens | Aspherical | −8.805 | 0.260 | Plastic | 1.67 | 20.4 | −106.31 |
| 8 |  | Aspherical | −10.151 | 0.100 |  |  |  |  |
| 9 | Fifth lens | Aspherical | −7.608 | 0.310 | Plastic | 1.64 | 23.8 | −20.47 |
| 10 |  | Aspherical | −18.418 | 0.224 |  |  |  |  |
| 11 | Sixth lens | Aspherical | −3.883 | 0.893 | Plastic | 1.53 | 55.8 | 5.12 |
| 12 |  | Aspherical | −1.738 | 0.100 |  |  |  |  |
| 13 | Seventh lens | Aspherical | 48.724 | 0.696 | Plastic | 1.67 | 20.4 | −4.48 |
| 14 |  | Aspherical | 2.840 | 0.210 |  |  |  |  |
| 15 | Eighth lens | Aspherical | 1.301 | 0.608 | Plastic | 1.53 | 55.8 | 128.36 |
| 16 |  | Aspherical | 1.109 | 0.489 |  |  |  |  |
| 17 | Infrared | Spherical | Infinite | 0.210 | Glass | 1.52 | 64.2 |  |
| 18 | Filter | Spherical | Infinite | 0.498 |  |  |  |  |
| 19 | Image plane | Spherical | Infinite | 0.000 |  |  |  |  |

Further, the aspherical coefficients of the image side surfaces or object side surfaces of the lenses of the optical system 100 are given in Table 12. Definitions of the various parameters can be obtained from the first embodiment, and will not be repeated herein.

TABLE 12

Sixth Embodiment

| Surface Number | 1 | 2 | 3 | 4 | 5 | 6 |
|---|---|---|---|---|---|---|
| K   | 3.582E−01  | 2.825E+01  | −9.835E+01 | −6.260E−01 | −2.037E−01 | 9.900E+01  |
| A4  | −3.839E−03 | −2.947E−02 | 5.113E−03  | 4.541E−04  | −1.138E−03 | −3.603E−02 |
| A6  | 1.856E−02  | −4.417E−02 | −4.405E−02 | 1.10E−03   | 3.302E−02  | −6.481E−03 |
| A8  | −7.292E−02 | 2.144E−01  | 6.541E−02  | −2.540E−02 | −2.432E−01 | −2.688E−02 |
| A10 | 1.219E−01  | −8.487E−01 | −1.399E−01 | 7.605E−02  | 8.786E−01  | 4.487E−02  |
| A12 | 2.207E−02  | 1.962E+00  | 2.955E−01  | −6.051E−02 | −1.834E+00 | 4.105E−02  |
| A14 | −4.140E−01 | −2.739E+00 | −4.241E−01 | −8.192E−02 | 2.322E+00  | −2.520E−01 |
| A16 | 6.521E−01  | 2.211E+00  | 3.717E−01  | 1.931E−01  | −1.763E+00 | 3.636E−01  |
| A18 | −4.381E−01 | −9.109E−01 | −1.540E−01 | −1.381E−01 | 7.393E−01  | −2.283E−01 |
| A20 | 1.124E−01  | 1.359E−01  | 2.117E−02  | 3.517E−02  | −1.318E−01 | 5.721E−02  |

| Surface Number | 7 | 8 | 9 | 10 | 11 | 12 |
|---|---|---|---|---|---|---|
| K   | 1.399E+00  | 2.125E+01  | 3.403E+01  | 9.900E+01  | −5.812E+00 | −4.974E+00 |
| A4  | −1.095E−01 | −4.712E−02 | 3.070E−02  | 1.483E−02  | −6.131E−02 | −5.292E−02 |
| A6  | 3.605E−02  | −1.009E−01 | −2.280E−01 | −2.356E−02 | 1.891E−01  | −2.498E−02 |
| A8  | −2.396E−01 | 8.182E−02  | 2.203E−01  | −1.523E−02 | −2.509E−01 | 6.171E−02  |
| A10 | 6.438E−01  | 1.396E−01  | 6.464E−01  | 6.802E−02  | 2.101E−01  | −7.691E−02 |
| A12 | −1.187E+00 | −3.634E−01 | −3.917E−01 | −8.161E−02 | −1.126E−01 | 5.671E−02  |
| A14 | 1.485E+00  | 3.879E−01  | 4.858E−01  | 5.513E−02  | 3.888E−02  | −2.463E−02 |
| A16 | −1.252E+00 | −2.506E−01 | −3.215E−01 | −2.220E−02 | −8.506E−03 | 6.442E−03  |
| A18 | 6.221E−01  | 9.244E−02  | 1.127E−01  | 4.924E−03  | 1.097E−03  | −9.517E−04 |
| A20 | −1.290E−01 | −1.419E−02 | −1.635E−02 | −4.620E−04 | −6.618E−05 | 6.075E−05  |

TABLE 12-continued

Sixth Embodiment

| Surface Number | 13 | 14 | 15 | 16 |
|---|---|---|---|---|
| K | −9.805E+01 | −8.173E+01 | −1.217E+01 | −5.646E+00 |
| A4 | 8.475E−02 | 5.657E−02 | −1.220E−01 | −6.732E−02 |
| A6 | −1.199E−01 | −5.942E−02 | 6.452E−03 | 7.341E−03 |
| A8 | 8.457E−02 | 1.990E−02 | 1.344E−02 | 4.078E−03 |
| A10 | −5.375E−02 | −4.319E−03 | −4.999E−03 | −1.669E−03 |
| A12 | 2.563E−02 | 8.650E−04 | 8.748E−04 | 2.870E−04 |
| A14 | −7.891E−03 | −1.596E−04 | −8.760E−05 | −2.752E−05 |
| A16 | 1.454E−03 | 1.992E−05 | 5.112E−06 | 1.517E−06 |
| A18 | −1.449E−04 | −1.325E−06 | −1.610E−07 | −4.460E−08 |
| A20 | 5.993E−06 | 3.471E−08 | 2.094E−09 | 5.361E−10 |

In addition, based on the parameter information provided above, the following relationships can be deduced:

(MIN6*MAX8/MAX6*MIN8)=0.810; (SAG61+SAG62)/(SAG71+SAG72)=0.734; Y71−Y62=0.361; 100*ΣCT/FOV=4.926; (CT7+CT8)/CT6=1.461; (ET2+ET3)/(CT2+CT3)=0.914; TTL/f=1.312; TTL/ImgH=1.558; f67/f=−9.584; and f4/f=−22.380.

Seventh Embodiment

Figure 13:
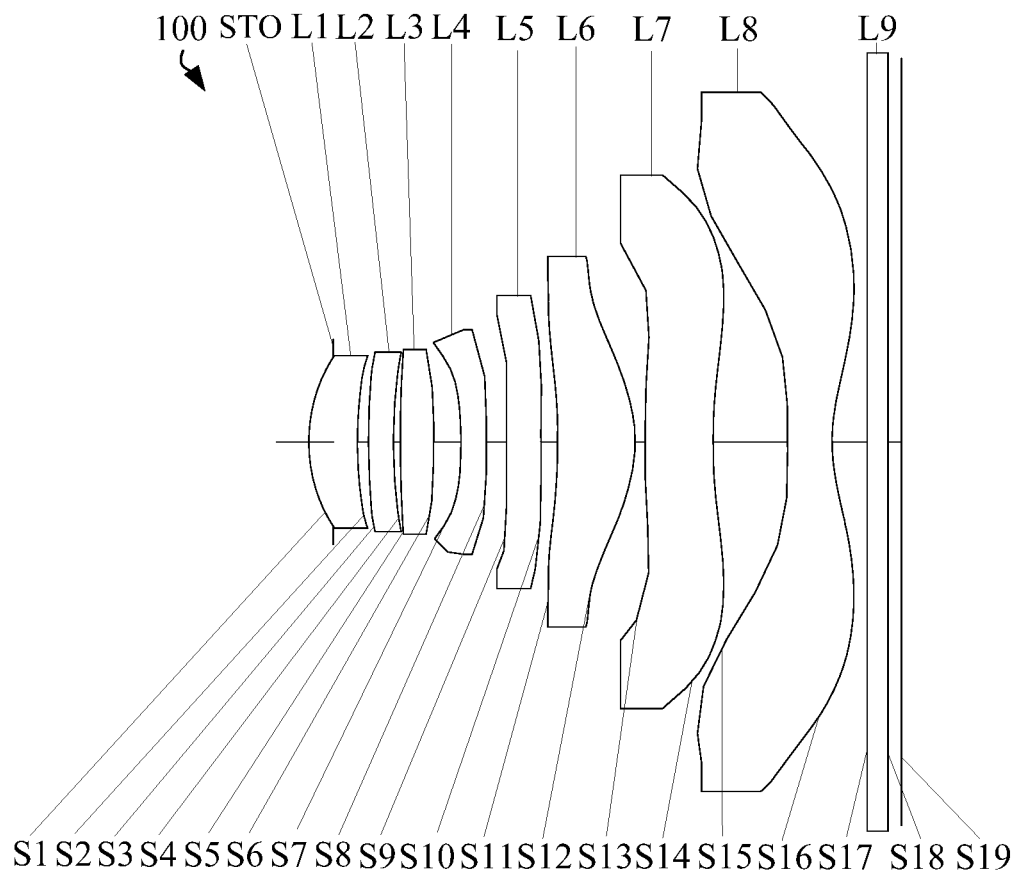
FIG. 13 is a schematic view of an optical system according to a seventh embodiment of the present disclosure.
Figure 14:
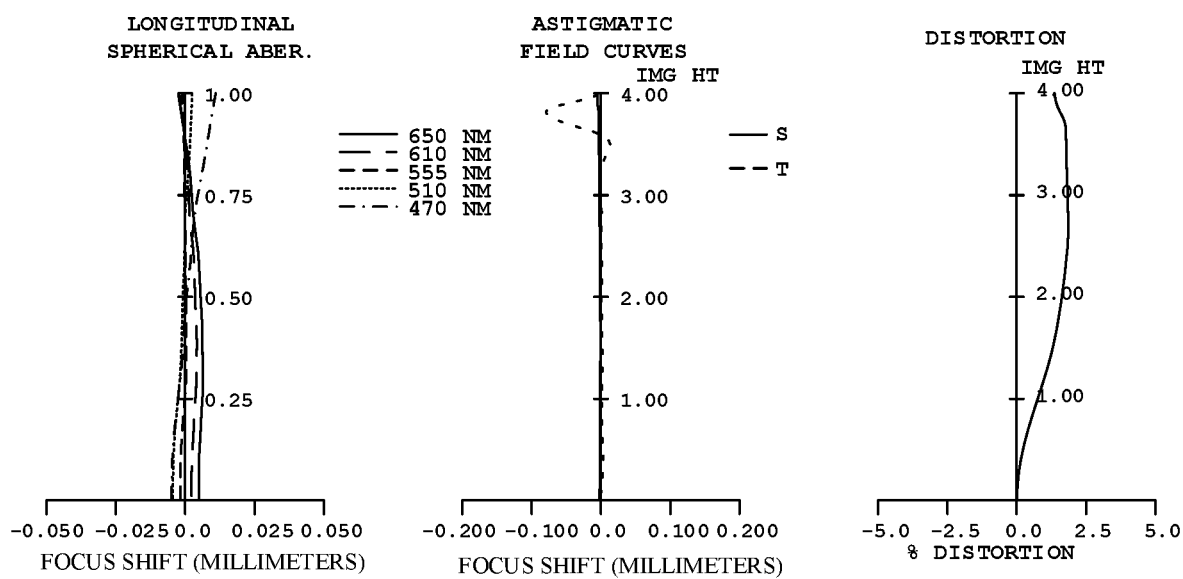
FIG. 14 is a graph showing spherical aberration, astigmatism, and distortion of the optical system according to the seventh embodiment of the present disclosure.

Referring to FIGS. 13 and 14, FIG. 13 is a schematic view of an optical system 100 according to the seventh embodiment. The optical system 100 includes, sequentially from an object side to an image side, a stop STO, a first lens L1 having a positive refractive power, a second lens L2 having a negative refractive power, a third lens L3 having a positive refractive power, a fourth lens L4 having a negative refractive power, a fifth lens L5 having a negative refractive power, a sixth lens L6 having a positive refractive power, a seventh lens L7 having a negative refractive power, and an eighth lens L8 having a negative refractive power. FIG. 14 is a graph showing spherical aberration, astigmatism, and distortion of the optical system 100 in the seventh embodiment sequentially from left to right.

An object side surface S1 of the first lens L1 is convex at a paraxial area and convex at a circumference thereof.

An image side surface S2 of the first lens L1 is concave at a paraxial area and concave at a circumference thereof.

An object side surface S3 of the second lens L2 is convex at a paraxial area and convex at a circumference thereof.

An image side surface S4 of the second lens L2 is concave at a paraxial area and concave at a circumference thereof.

An object side surface S5 of the third lens L3 is convex at a paraxial area and convex at a circumference thereof.

An image side surface S6 of the third lens L3 is convex at a paraxial area and convex at a circumference thereof.

An object side surface S7 of the fourth lens L4 is concave at a paraxial area and concave at a circumference thereof.

An image side surface S8 of the fourth lens L4 is convex at a paraxial area and convex at a circumference thereof.

An object side surface S9 of the fifth lens L5 is convex at a paraxial area and concave at a circumference thereof.

An image side surface S10 of the fifth lens L5 is concave at a paraxial area and convex at a circumference thereof.

An object side surface S11 of the sixth lens L6 is concave at a paraxial area and concave at a circumference thereof.

An image side surface S12 of the sixth lens L6 is convex at a paraxial area and convex at a circumference thereof.

An object side surface S13 of the seventh lens L7 is convex at a paraxial area and concave at a circumference thereof.

An image side surface S14 of the seventh lens L7 is concave at a paraxial area and convex at a circumference thereof.

An object side surface S15 of the eighth lens L8 is concave at a paraxial area and convex at a circumference thereof.

An image side surface S16 of the eighth lens L8 is concave at a paraxial area and convex at a circumference thereof.

The object side surfaces and the image side surfaces of the first lens L1, the second lens L2, the third lens L3, the fourth lens L4, the fifth lens L5, the sixth lens L6, the seventh lens L7, and the eighth lens L8 are all aspherical.

The first lens L1, the second lens L2, the third lens L3, the fourth lens L4, the fifth lens L5, the sixth lens L6, the seventh lens L7, and the eighth lens L8 are all made of plastic.

In addition, various parameters of the optical system 100 are given in Table 13. Definitions of the various parameters can be obtained from the first embodiment, and will not be repeated herein.

TABLE 13

Seventh Embodiment
f = 4.50 mm, FNO = 2.48, FOV = 81.5°

| Surface Number | Surface Name | Surface Type | Y radius (mm) | Thickness (mm) | Material | Refractive index | Abbe number | Focal Length (mm) |
|---|---|---|---|---|---|---|---|---|
| | Object plane | Spherical | Infinite | 400.000 | | | | |
| | Stop | Spherical | Infinite | −0.247 | | | | |
| 1 | First lens | Aspherical | 1.896 | 0.493 | Plastic | 1.54 | 56.1 | 5.07 |
| 2 | | Aspherical | 5.478 | 0.111 | | | | |
| 3 | Second lens | Aspherical | 7.963 | 0.250 | Plastic | 1.53 | 55.8 | −41.93 |
| 4 | | Aspherical | 5.817 | 0.071 | | | | |
| 5 | Third lens | Aspherical | 14.758 | 0.341 | Plastic | 1.53 | 55.8 | 15.32 |
| 6 | | Aspherical | −18.426 | 0.273 | | | | |

TABLE 13-continued

Seventh Embodiment
f = 4.50 mm, FNO = 2.48, FOV = 81.5°

| Surface Number | Surface Name | Surface Type | Y radius (mm) | Thickness (mm) | Material | Refractive index | Abbe number | Focal Length (mm) |
|---|---|---|---|---|---|---|---|---|
| 7 | Fourth lens | Aspherical | −6.352 | 0.260 | Plastic | 1.67 | 20.4 | −9.66 |
| 8 | | Aspherical | −217.019 | 0.200 | | | | |
| 9 | Fifth lens | Aspherical | 29.713 | 0.350 | Plastic | 1.64 | 23.8 | −137.97 |
| 10 | | Aspherical | 22.132 | 0.169 | | | | |
| 11 | Sixth lens | Aspherical | −8.269 | 0.785 | Plastic | 1.53 | 55.8 | 3.78 |
| 12 | | Aspherical | −1.684 | 0.100 | | | | |
| 13 | Seventh lens | Aspherical | 92.564 | 0.690 | Plastic | 1.67 | 20.4 | −12.17 |
| 14 | | Aspherical | 7.551 | 0.753 | | | | |
| 15 | Eighth lens | Aspherical | −86.865 | 0.450 | Plastic | 1.53 | 55.8 | −3.82 |
| 16 | | Aspherical | 2.102 | 0.356 | | | | |
| 17 | Infrared | Spherical | Infinite | 0.210 | Glass | 1.52 | 64.2 | |
| 18 | Filter | Spherical | Infinite | 0.136 | | | | |
| 19 | Image plane | Spherical | Infinite | 0.000 | | | | |

Further, the aspherical coefficients of the image side surfaces or object side surfaces of the lenses of the optical system 100 are given in Table 14. Definitions of the various parameters can be obtained from the first embodiment, and will not be repeated herein.

TABLE 14

Seventh Embodiment

| Surface Number | 1 | 2 | 3 | 4 | 5 | 6 |
|---|---|---|---|---|---|---|
| K | 5.374E−01 | 2.939E+01 | −3.825E+01 | −3.387E−01 | −4.938E+00 | 9.201E+01 |
| A4 | 6.762E−04 | −1.633E−02 | −8.665E−03 | −2.880E−03 | −9.042E−05 | −4.854E−02 |
| A6 | −9.680E−03 | 6.172E−03 | 6.518E−03 | 1.446E−02 | 2.315E−02 | 2.048E−03 |
| A8 | 1.362E−01 | −3.111E−02 | 6.069E−02 | 2.965E−02 | −1.237E−01 | −8.225E−02 |
| A10 | −7.035E−01 | 1.107E−01 | −4.450E−01 | −4.803E−01 | 3.077E−01 | 2.206E−01 |
| A12 | 2.102E+00 | −5.128E−01 | 1.423E+00 | 1.730E+00 | −5.278E−01 | −3.317E−01 |
| A14 | −3.746E+00 | 1.419E+00 | −2.543E+00 | −3.222E+00 | 7.089E−01 | 2.724E−01 |
| A16 | 3.940E+00 | −2.179E+00 | 2.740E+00 | 3.474E+00 | −6.718E−01 | −3.830E−02 |
| A18 | −2.251E+00 | 1.772E+00 | −1.626E+00 | −2.063E+00 | 3.688E−01 | −1.244E−01 |
| A20 | 5.389E−01 | −5.921E−01 | 4.193E−01 | 5.192E−01 | −8.534E−02 | 8.094E−02 |

| Surface Number | 7 | 8 | 9 | 10 | 11 | 12 |
|---|---|---|---|---|---|---|
| K | 3.596E+00 | 9.900E+01 | −4.207E+01 | −9.900E+01 | 4.201E+00 | −7.315E+00 |
| A4 | −1.395E−01 | −6.685E−02 | −2.431E−03 | −2.902E−02 | −2.965E−02 | −5.938E−02 |
| A6 | 1.262E−02 | −1.936E−02 | −8.890E−02 | −1.872E−02 | 1.194E−01 | 7.804E−02 |
| A8 | −1.366E−01 | 8.114E−02 | 2.162E−01 | −6.088E−03 | −2.553E−01 | −9.849E−02 |
| A10 | 3.082E−01 | −2.028E−01 | −3.205E−01 | 5.996E−02 | 3.157E−01 | 8.487E−02 |
| A12 | −4.655E−01 | 3.318E−01 | 3.066E−01 | −7.217E−02 | −2.308E−01 | −4.241E−02 |
| A14 | 5.302E−01 | −3.296E−01 | −1.934E−01 | 4.361E−02 | 1.036E−01 | 1.256E−02 |
| A16 | −4.047E−01 | 1.890E−01 | 7.714E−02 | −1.482E−02 | −2.822E−02 | −2.184E−03 |
| A18 | 1.420E−01 | −5.820E−02 | −1.779E−02 | 2.684E−03 | 4.292E−03 | 2.050E−04 |
| A20 | 7.789E−04 | 7.624E−03 | 1.789E−03 | −2.008E−04 | −2.804E−04 | −7.975E−06 |

| Surface Number | 13 | 14 | 15 | 16 |
|---|---|---|---|---|
| K | −9.900E+01 | −7.196E+00 | 8.017E+01 | −6.170E+00 |
| A4 | 9.421E−02 | 3.157E−02 | −7.331E−02 | −4.870E−02 |
| A6 | −1.187E−01 | −4.415E−02 | 3.715E−03 | 1.185E−02 |
| A8 | 7.979E−02 | 2.314E−02 | 7.287E−03 | −1.866E−03 |
| A10 | −3.833E−02 | −7.768E−03 | −2.781E−03 | 1.261E−04 |
| A12 | 1.349E−02 | 1.740E−03 | 5.139E−04 | 1.109E−05 |
| A14 | −3.444E−03 | −2.603E−04 | −5.535E−05 | −3.253E−06 |
| A16 | 6.008E−04 | 2.521E−05 | 3.530E−06 | 2.968E−07 |
| A18 | −6.284E−05 | −1.440E−06 | −1.239E−07 | −1.251E−08 |
| A20 | 2.911E−06 | 3.697E−08 | 1.848E−09 | 2.035E−10 |

In addition, based on the parameter information provided above, the following relationships can be deduced:

(MIN6*MAX8/MAX6*MIN8)=1.573; (SAG61+SAG62)/(SAG71+SAG72)=0.674; Y71−Y62=0.141; 100*ΣCT/FOV=4.441; (CT7+CT8)/CT6=1.453; (ET2+ET3)/(CT2+CT3)=0.846; TTL/f=1.333; TTL/ImgH=1.500; f67/f=1.161; and f4/f=−2.147.

Figure 15:
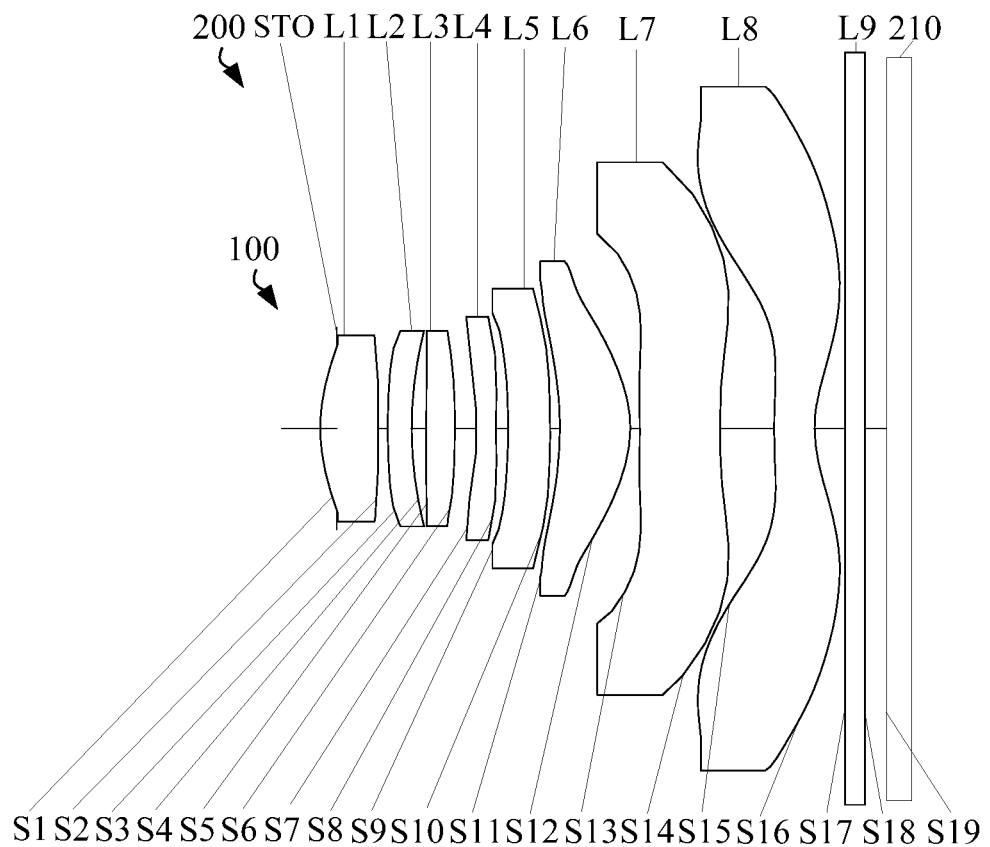
FIG. 15 is a schematic view of an image capturing module according to an embodiment of the present disclosure.

Referring to FIG. 15, in some embodiments, the optical system 100 can be assembled with a photosensitive element 210 to form an image capturing module 200. At this case, a photosensitive surface of the photosensitive element 210 can be regarded as the image plane S19 of the optical system 100. The image capturing module 200 may also be provided with an infrared filter L9, and the infrared filter L9 is disposed between the image side surface S16 of the eighth lens L8 and the image plane S19. Specifically, the photosensitive element 210 may be a charge coupled device (CCD) or a complementary metal oxide semiconductor (CMOS). By using the aforementioned optical system 100 in the image capturing module 200, the wide-angle characteristic and astigmatism of the optical system 100 are balanced, so that the astigmatism is not too large while the image capturing module 200 has a large field of view, thereby ensuring that the image capturing module 200 has excellent imaging quality.

Figure 16:
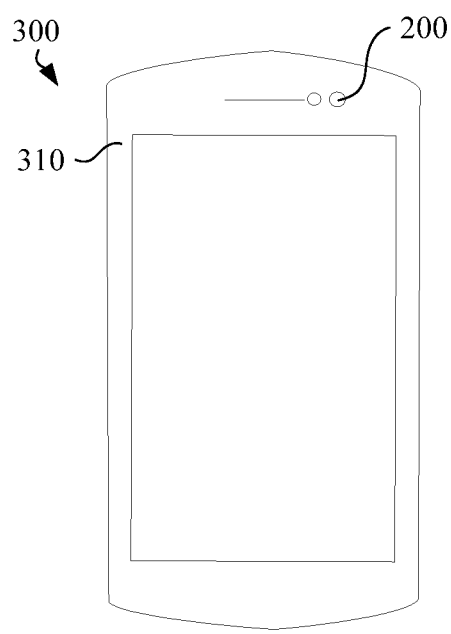
FIG. 16 is a schematic view of an electronic device according to an embodiment of the present disclosure.
Figure 17:
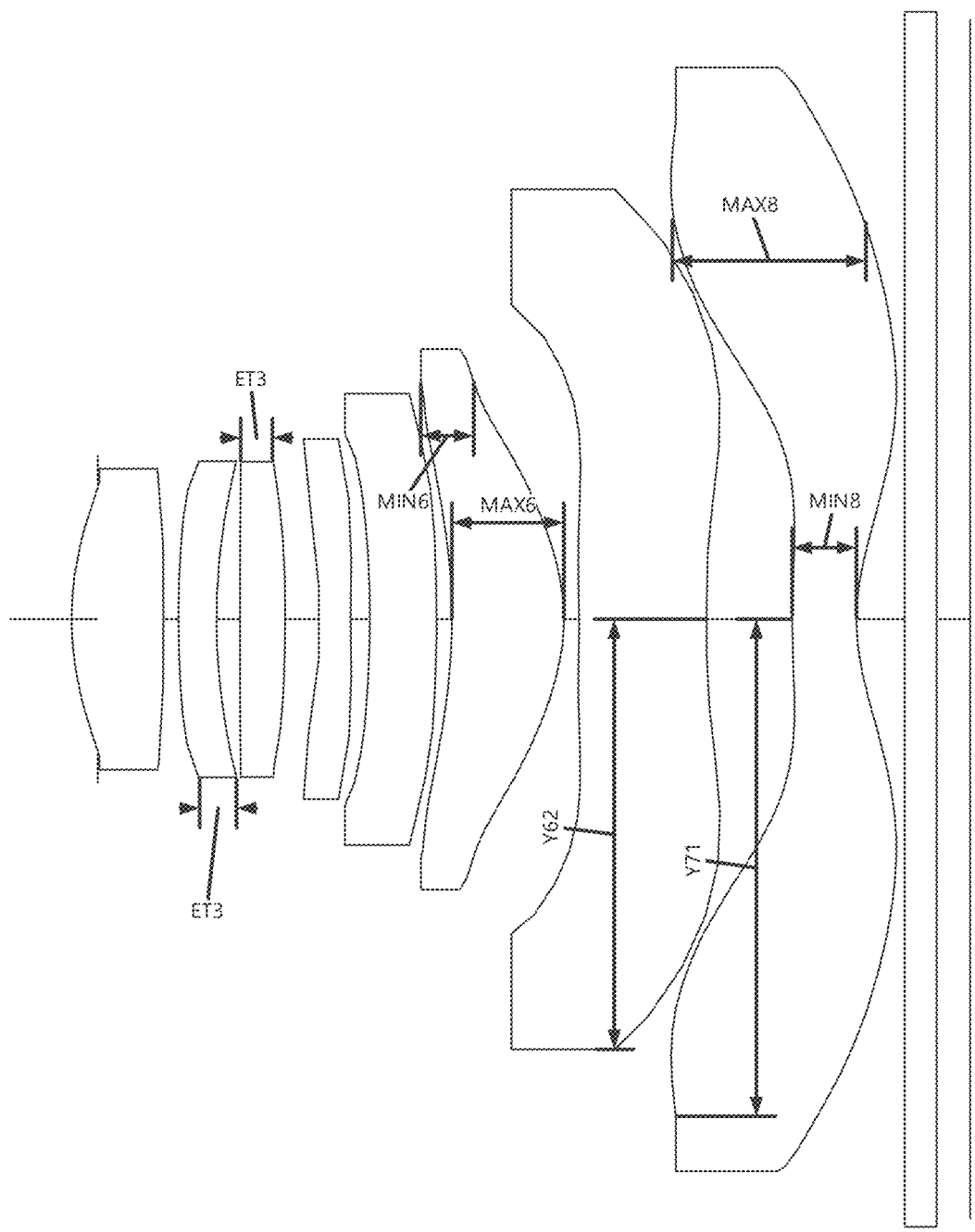
FIG. 17 is the schematic view of the optical system according to the first embodiment showing some optical parameters.
Figure 18:
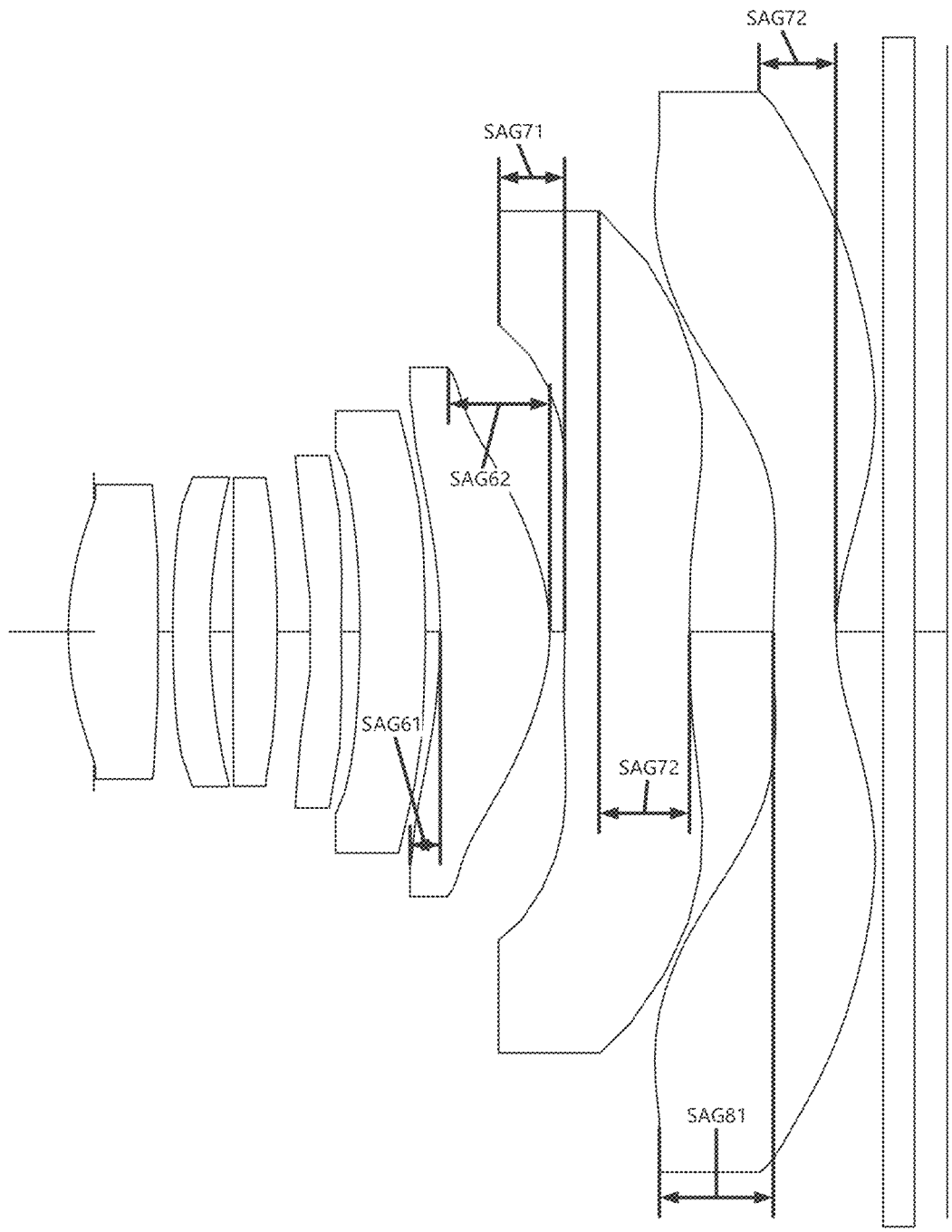
FIG. 18 is the schematic view of the optical system according to the first embodiment showing some other optical parameters.

Referring to FIGS. 15 and 16, in some embodiments, the image capturing module 200 can be applied to an electronic device 300. The electronic device 300 includes a housing 310, and the image capturing module 200 is disposed in the housing 310. Specifically, the electronic device 300 may be, but is not limited to, a cellular phone, a video phone, a smart phone, an electronic book reader, an onboard photographing device such as an automobile data recorder, or a wearable device such as a smart watch. The image capturing module 200 is adopted in the electronic device 300, so that the astigmatism is not too large while the electronic device 300 has a large field of view, thereby ensuring that the electronic device 300 has excellent imaging quality.

In the description of the present disclosure, it should be understood that orientation or positional relationships indicated by terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on orientation or positional relationship shown in the drawings, which are merely to facilitate the description of the present disclosure and simplify the description, not to indicate or imply that the device or elements must have a particular orientation, be constructed and operated in a particular orientation, and therefore cannot be construed as a limitation on the present disclosure.

In addition, the terms "first" and "second" are used for description only, and cannot be understood as indicating or implying relative importance or implicitly indicating the number of technical features described. Thus, the features defined with "first" and "second" may include at least one of the features explicitly or implicitly. In the description of the present disclosure, the meaning of "plurality" is at least two, such as two, three, etc., unless explicitly defined otherwise.

In the present disclosure, unless explicitly specified and limited otherwise, the terms "mounting", "connecting", "connected", "fixed" and the like should be understood in a broad sense. For example, it may be a fixed connection or a detachable connection, or an integration, may be a mechanical connection or electrical connection, may be a direct connection, or may be an indirect connection through an intermediate medium, may be the connection between two elements or the interaction relationship between two elements, unless explicitly defined otherwise. The specific meanings of the above terms in the present disclosure can be understood by one of those ordinary skills in the art according to specific circumstances.

In the present disclosure, unless explicitly specified and limited otherwise, the first feature being "on" or "below" the second feature may be that the first and second features are in a direct contact, or the first and second features are in an indirectly contact through an intermediate medium. Moreover, the first feature being "over", "above" and "on" the second feature may be that the first feature is directly above or obliquely above the second feature, or simply means that the first feature is higher than the second feature in horizontal direction. The first feature being "beneath", "under", and "below" the second feature may be that the first feature is directly below or obliquely below the second feature, or simply means that the first feature is lower than the second feature in horizontal direction.

In the descriptions of this specification, the descriptions with reference to the terms "an embodiment", "some embodiments", "example", "specific example", or "some examples", or the like means that the specific features, structures, materials or characteristics described with reference to the embodiments or examples are included in at least one embodiment or example of the present disclosure. In this specification, the schematic representations of the above terms do not necessarily refer to a same embodiment or example. Moreover, the described specific features, structures, materials or characteristics can be combined in an appropriate manner in any one or more embodiments or examples. In addition, those skilled in the art can combine and assemble the different embodiments or examples and the features of the different embodiments or examples described in this specification without contradicting each other.

The technical features of the above described embodiments can be combined arbitrarily. To simplify the description, not all possible combinations of the technical features in the above embodiments are described. However, all of the combinations of these technical features should be considered as within the scope of the present disclosure, as long as such combinations do not contradict with each other.

The above described embodiments are merely illustrating several embodiments of the present disclosure, which are described more specifically and in detail, but they cannot be understood as limiting the scope of the present disclosure. It should be noted that, for those ordinary skilled in the art, several variations and improvements may be made without departing from the concept of the present disclosure, and all of which are within the protection scope of the present disclosure. Therefore, the protection scope of the present disclosure shall be defined by the appended claims.

What is claimed is:

1. An optical system, sequentially from an object side to an image side, comprising:
   a stop;
   a first lens having a positive refractive power, an object side surface of the first lens being convex at a paraxial area;
   a second lens having a refractive power;
   a third lens having a refractive power;
   a fourth lens having a refractive power;
   a fifth lens having a refractive power;
   a sixth lens having a positive refractive power, an image side surface of the sixth lens being convex at a paraxial area;
   a seventh lens having a refractive power; and
   an eighth lens having a refractive power, an image side surface of the eighth lens being concave at a paraxial area;
   wherein the optical system satisfies the following condition:

$[(MIN6*MAX8)/(MAX6*MIN8)] \leq 2;$ wherein within a maximum effective aperture of the sixth lens, MIN6 is a minimum thickness of the sixth lens in a direction parallel to an optical axis, and MAX6 is a maximum thickness of the sixth lens in the direction parallel to the optical axis; within a maximum effective aperture of the eighth lens, MIN8 is a minimum thickness of the eighth lens in the direction parallel to the optical axis, and MAX8 is a maximum thickness of the eighth lens in the direction parallel to the optical axis.

2. The optical system according to claim 1, further satisfying the following condition:

$$(SAG61+SAG62)/(SAG71+SAG72) \leq 2;$$

wherein SAG61 is a distance in the direction parallel to the optical axis from an intersection of an object side surface of the sixth lens and the optical axis to a position of a maximum effective radius of the object side surface of the sixth lens, SAG62 is a distance in the direction parallel to the optical axis from an intersection of the image side surface of the sixth lens and the optical axis to a position of a maximum effective radius of the image side surface of the sixth lens, SAG71 is a distance in the direction parallel to the optical axis from an intersection of an object side surface of the seventh lens and the optical axis to a position of a maximum effective radius of the object side surface of the seventh lens, and SAG72 is a distance in the direction parallel to the optical axis from an intersection of an image side surface of the seventh lens and the optical axis to a position of a maximum effective radius of the image side surface of the seventh lens.

3. The optical system according to claim 1, further satisfying the following condition:

$$0 \leq Y71-Y62 \leq 1 \text{ mm};$$

wherein Y62 is a maximum effective aperture of the image side surface of the sixth lens, and Y71 is a maximum effective aperture of an object side surface of the seventh lens.

4. The optical system according to claim 1, further satisfying the following condition:

$$3 \text{ mm/degrees} \leq 100 * \Sigma CT/FOV \leq 5 \text{ mm/degrees};$$

wherein $\Sigma CT$ is a sum of thicknesses of the first lens, the second lens, the third lens, the fourth lens, the fifth lens, the sixth lens, the seventh lens, and the eighth lens on the optical axis, and FOV is a maximum field of view of the optical system.

5. The optical system according to claim 1, further satisfying the following condition:

$$0 \leq (CT7+CT8)/CT6 \leq 2;$$

wherein CT6 is a thickness of the sixth lens on the optical axis, CT7 is a thickness of the seventh lens on the optical axis, and CT8 is a thickness of the eighth lens on the optical axis.

6. The optical system according to claim 1, further satisfying the following condition:

$$(ET2+ET3)/(CT2+CT3) \leq 1;$$

wherein ET2 is a distance in the direction parallel to the optical axis from a maximum effective aperture of an object side surface of the second lens to a maximum effective aperture of an image side surface of the second lens, ET3 is a distance in the direction parallel to the optical axis from a maximum effective aperture of an object side surface of the third lens to a maximum effective aperture of an image side surface of the third lens, CT2 is a thickness of the second lens on the optical axis, and CT3 is a thickness of the third lens on the optical axis.

7. The optical system according to claim 1, further satisfying the following condition:

$$1.31 \leq TTL/f \leq 1.48;$$

wherein TTL is a distance from the object side surface of the first lens to an imaging plane of the optical system on the optical axis, and f is a total effective focal length of the optical system.

8. The optical system according to claim 1, further satisfying the following condition:

$$1 \leq TTL/\text{ImgH} \leq 1.56;$$

wherein TTL is a distance from the object side surface of the first lens to an imaging plane of the optical system on the optical axis, and ImgH is half of a diagonal length of an effective pixel area of the optical system on the imaging plane.

9. The optical system according to claim 1, further satisfying the following condition:

$$-10 \leq f67/f \leq 3;$$

wherein f67 is a combined focal length of the sixth lens and the seventh lens, and f is a total effective focal length of the optical system.

10. The optical system according to claim 1, further satisfying the following condition:

$$-23 \leq f4/f \leq 24;$$

wherein f4 is an effective focal length of the fourth lens, and f is a total effective focal length of the optical system.

11. The optical system according to claim 1, further satisfying the following condition:

$$3.43 \text{ mm} \leq f \leq 4.75 \text{ mm};$$

wherein f is a total effective focal length of the optical system.

12. The optical system according to claim 1, further satisfying the following condition:

$$2.02 \leq FNO \leq 2.48;$$

wherein FNO is an F-number of the optical system.

13. The optical system according to claim 1, further satisfying the following condition:

$$78.36 \text{ degrees} \leq FOV \leq 97.5 \text{ degrees};$$

wherein FOV is a maximum field of view of the optical system.

14. The optical system according to claim 1, further satisfying the following condition:

$$\text{ImgH}=4.00 \text{ mm};$$

wherein ImgH is half of a diagonal length of an effective pixel area of the optical system on an imaging plane.

15. The optical system according to claim 1, further satisfying the following condition:

$$4.89 \text{ mm} \leq TTL \leq 6.23 \text{ mm};$$

wherein TTL is a distance from the object side surface of the first lens to an imaging plane of the optical system on the optical axis.

16. The optical system according to claim 1, further comprising an infrared cut-off filter arranged on an image side of the eighth lens.

17. The optical system according to claim 1, wherein an object side surface and an image side surface of each of the lenses in the optical system are both aspherical or spherical.

18. The optical system according to claim 1, wherein the lenses of the optical system are made of glass or plastic.

19. An image capturing module, comprising a photosensitive element and the optical system of claim 1, the photosensitive element being arranged on the image side of the optical system, and light passing through the optical system to form an image on the photosensitive element.

20. An electronic device, comprising a housing and the image capturing module of claim 19, the image capturing module being disposed in the housing.

* * * * *